United States Patent
Ghose et al.

(10) Patent No.: US 8,352,769 B1
(45) Date of Patent: Jan. 8, 2013

(54) SYSTEM AND METHOD FOR QUERYING FOR ENERGY DATA IN A NETWORK ENVIRONMENT

(75) Inventors: Tirthankar Ghose, Antioch, CA (US); David W. Kunkel, Santa Clara, CA (US); Matthew A. Laherty, Bloomington, IN (US); John D. Parello, Campbell, CA (US)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 12/368,154

(22) Filed: Feb. 9, 2009

(51) Int. Cl.
*G06F 1/26* (2006.01)

(52) U.S. Cl. .................. 713/324; 713/310; 713/320

(58) Field of Classification Search .................. 713/300
See application file for complete search history.

(56) References Cited

U.S. PATENT DOCUMENTS

| | | | |
|---|---|---|---|
| 4,785,927 A | 11/1988 | Dobbins | |
| 6,269,343 B1 | 7/2001 | Pallakoff | |
| 6,415,270 B1 | 7/2002 | Rackson et al. | |
| 6,618,709 B1 * | 9/2003 | Sneeringer | 705/412 |
| 6,681,156 B1 | 1/2004 | Weiss | |
| 6,785,592 B1 * | 8/2004 | Smith et al. | 700/291 |
| 6,930,947 B2 | 8/2005 | Chen | |
| 6,980,526 B2 | 12/2005 | Jang et al. | |
| 7,084,752 B2 | 8/2006 | Parello et al. | |
| 7,188,260 B1 | 3/2007 | Shaffer et al. | |
| 7,263,450 B2 * | 8/2007 | Hunter | 702/65 |
| 7,366,933 B1 * | 4/2008 | Aharonian et al. | 713/340 |
| 7,392,407 B2 | 6/2008 | Jonnala et al. | |
| 7,698,580 B2 * | 4/2010 | Schindler et al. | 713/300 |
| 7,966,502 B2 | 6/2011 | Diab et al. | |
| 7,974,298 B2 | 7/2011 | Baird et al. | |
| 2002/0040475 A1 | 4/2002 | Yap et al. | |
| 2004/0148388 A1 | 7/2004 | Chung et al. | |
| 2005/0243861 A1 * | 11/2005 | Elkayam et al. | 370/466 |
| 2007/0024239 A1 | 2/2007 | Park | |
| 2007/0050818 A1 | 3/2007 | Berger et al. | |
| 2007/0135086 A1 * | 6/2007 | Stanford | 455/402 |
| 2007/0143637 A1 | 6/2007 | Tsai | |
| 2007/0214473 A1 | 9/2007 | Barton et al. | |
| 2008/0001584 A1 | 1/2008 | Chen | |
| 2008/0037999 A1 | 2/2008 | Masuda | |
| 2008/0052546 A1 * | 2/2008 | Schindler et al. | 713/300 |
| 2008/0063381 A1 | 3/2008 | Conroy et al. | |

(Continued)

OTHER PUBLICATIONS

"Cisco Energywise"; Cisco Systems; Feb. 1, 2009; archived from http://www.archive.org; pp. 1-6.*

(Continued)

*Primary Examiner* — Ryan Stiglic

(74) *Attorney, Agent, or Firm* — Patent Capital Group

(57) ABSTRACT

A method is provided in one example embodiment and includes communicating a query over a network to a plurality of entities that reside in a domain, the query including a request for data relating to energy use. The query can be generated by one or more computing devices belonging to the domain. A selected one of the computing devices can control power consumption for the entities in the domain. In other embodiments, a discovery protocol (DP) and a link layer discovery protocol (LLDP) is used for transporting events regarding the entities that connect or disconnect from the network. The entities send discovery events over a DP/LLDP protocol, identifying them as part of the domain. In yet other embodiments, the method includes querying a selected one of the entities to determine, if the selected entity moved to a certain energy level, an energy consumption value at the certain energy level.

26 Claims, 13 Drawing Sheets

U.S. PATENT DOCUMENTS

| | | | |
|---|---|---|---|
| 2008/0215899 | A1 | 9/2008 | Jonnala et al. |
| 2008/0215902 | A1* | 9/2008 | Jonnala et al. ............... 713/320 |
| 2008/0225841 | A1 | 9/2008 | Conway et al. |
| 2008/0256371 | A1* | 10/2008 | Diab et al. .................... 713/300 |
| 2008/0272741 | A1 | 11/2008 | Kanamori |
| 2008/0303486 | A1 | 12/2008 | Kao |
| 2009/0049315 | A1* | 2/2009 | Diab et al. .................... 713/310 |
| 2009/0083167 | A1* | 3/2009 | Subbloie ........................ 705/34 |
| 2009/0196281 | A1 | 8/2009 | Kouchri |
| 2009/0228723 | A1* | 9/2009 | Yoshizaki ..................... 713/300 |
| 2010/0052421 | A1* | 3/2010 | Schindler et al. ............... 307/35 |
| 2010/0070217 | A1* | 3/2010 | Shimada et al. ............... 702/62 |
| 2010/0080111 | A1 | 4/2010 | Diab et al. |
| 2010/0162294 | A1 | 6/2010 | Yin et al. |
| 2010/0162305 | A1 | 6/2010 | Downey et al. |
| 2010/0172628 | A1 | 7/2010 | Berger et al. |
| 2010/0205466 | A1* | 8/2010 | Diab et al. .................... 713/310 |
| 2010/0235868 | A1 | 9/2010 | Howarter et al. |
| 2010/0241880 | A1 | 9/2010 | Wertheimer et al. |
| 2010/0247068 | A1 | 9/2010 | Howarter et al. |
| 2010/0309904 | A1 | 12/2010 | Couse |
| 2010/0322078 | A1 | 12/2010 | Wang et al. |
| 2010/0329108 | A1 | 12/2010 | Diab et al. |
| 2011/0022699 | A1 | 1/2011 | Powell et al. |
| 2011/0029796 | A1 | 2/2011 | Matthews et al. |
| 2011/0067048 | A1 | 3/2011 | Barton et al. |
| 2011/0072286 | A1 | 3/2011 | Graham |
| 2011/0131428 | A1 | 6/2011 | Diab et al. |
| 2011/0157939 | A1 | 6/2011 | Wang |
| 2011/0199046 | A1 | 8/2011 | Tsai |
| 2011/0246797 | A1 | 10/2011 | Diab et al. |

OTHER PUBLICATIONS

Bruce Nordman, "Energy Efficient Ethernet: Outstanding Questions," Mar. 12, 2007; 3 pages http://grouper.ieee.org/groups/802/3/eee_study/public/mar07/nordman2_01_0307.pdf.

Onn Haran, "Applicability of EEE to Fiber PHYs," IEEE 8.02.3 EEE Meeting; Sep. 2007, Seoul, Korea http://www.ieee802.org/3/eee_study/public/sep07/haran_1_0907.pdf; 12 pages.

Mike Bennett, "IEEE 802.3az Energy Efficient Ethernet," Task Force Update, Presented to the P802.3ba Task Force, Denver, CO; Jul. 16, 2008; 17 pages http://www.ieee802.org/3/az/public/jul08/bennett_03_0708.pdf.

Aviad Wertheimer and Eric Mann, "Active/Idle Toggling with Low-Power Idle," IEEE 802.3az Jan. 2008 Interim Meeting; 15 pages Active/Idle Toggling with Low-Power Idle.

Bruce Nordman, et al., "Energy Efficiency and Regulation," IEEE 802 Tutorial;Jul. 13, 2009; 58 pages.

SMART Board™, "Interactive Whiteboard," Sep. 2005; 2 pages.

U.S. Appl. No. 12/368,124, filed Feb. 9, 2009, entitled "System and Method for Intelligent Energy Management in a Network Environment," Inventor(s): Tirthankar Ghose et al.

U.S. Appl. No. 12/700,175, filed Feb. 4, 2010, entitled "System and Method for Managing Power Consumption in Data Environments," Inventor: Anoop Vetteth.

"IEEE Standard for Information technology—Telecommunications and information exchange between systems—Local and metropolitan area networks—Specific requirements Part 3: Carrier Sense Multiple Access with Collision Detection (CSMA/CD) Access Method and Physical Layer Specifications Amendment: Data Terminal Equipment (DTE) Power via Media Dependent Interface (MDI)," ©2003 IEEE, Jun. 18, 2003, 121 pages.

Battery University, "How to Prolong Lithium-based Batteries," © 2011 Isidor Buchmann, 15 pages; http://www.batteryuniversity.com/parttwo-34.htm.

Claise, Benoit, et al., "Energy Management (eman): Description of Working Group," retrieved and printed on Aug. 17, 2011, 3 pages http://datatracker.ietf.org/wg/eman/charter/.

USPTO Nov. 10, 2011 Final Office Action from U.S. Appl. No. 12/368,124.

U.S. Appl. No. 12/826,416, filed Jun. 29, 2010, entitled "System and Method for Providing Intelligent Power Management in a Network Environment," Inventors: Ram Mohan R., et al.

U.S. Appl. No. 13/211,798, filed Aug. 17, 2011, entitled "System and Method for Notifying and for Controlling Power Demand," Inventors: Benoit Claise, et al.

USPTO Jun. 23, 2011 Nonfinal Office Action from U.S. Appl. No. 12/368,124.

USPTO Sep. 23, 2011 Response to Jun. 23, 2011 Nonfinal Office Action filed in U.S. Appl. No. 12/368,124.

U.S. Appl. No. 13/302,544, filed Nov. 22, 2011, entitled "System and Method for Network Enabled Wake for Networks," Inventors: Charles B. Schoening, et al.

U.S. Appl. No. 13/226,326, filed Sep. 6, 2011, entitled "Power Conservation in a Distributed Digital Video Recorder/Content Delivery Network System," Inventor: William VerSteeg.

USPTO Feb. 7, 2012 RCE Response to Final Office Action mailed Nov. 10, 2011 from U.S. Appl. No. 12/368,124.

"Wake on Local Area Network (LAN)," EnergyStar Products, Energy Star; [printed on Nov. 16, 2011]; 4 pages; http://www.energystar.gov/index.cfm?c=power_mgt.pr_power_mgt_wol.

U.S. Appl. No. 13/492,617 filed, Jun. 8, 2012, entitled "System and Method for Detecting a Power Source and Metering Points of a Network Device in a Network Environment," Inventor: John D. Parello, et al.

USPTO May 24, 2012 Non Final Office Action from U.S. Appl. No. 12/700,175.

USPTO Jun. 20, 2012 Non-Final Office Action from U.S. Appl. No. 12/826,416.

USPTO Aug. 7, 2012 Response to May 24, 2012 Non Final Office Action from U.S. Appl. No. 12/700,175.

USPTO Aug. 22, 2012 Non-Final Office Action from U.S. Appl. No. 12/368,124.

USPTO Sep. 19, 2012 Response to Jun. 20, 2012 Non-Final Office Action from U.S. Appl. No. 12/826,416.

USPTO Oct. 5, 2012 Final Office Action from U.S. Appl. No. 12/700,175.

* cited by examiner

SYSTEM AND METHOD FOR QUERYING FOR ENERGY DATA IN A NETWORK ENVIRONMENT

TECHNICAL FIELD OF THE INVENTION

This invention relates in general to the field of energy management and, more particularly, to querying for energy data in a network environment.

BACKGROUND OF THE INVENTION

Energy consumption has moved to the forefront of virtually all industrialized societies. Both consumers and businesses have become more in tune with their energy usage. Whether motivated by altruistic reasons, or by profitability concerns, society has come to terms with the notion that energy is a finite commodity, whose cost should be managed. Administrators are now focused on power usage and, more specifically, how to reduce those expenditures.

Over the past few decades, device manufacturers have added instrumentation and features to help in existing areas of the network. For example, FCAPS is an acronym for Fault, Configuration, Accounting, Performance, Security, and these items represent the management categories into which the ISO model defines network management tasks. FCAPS is also the ISO Telecommunications Management Network model and framework for network management. However, as network systems have become more sophisticated, while energy demands have significantly increased, nothing has evolved to match network capabilities with more intelligent energy consumption.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes communicating a query over a network to a plurality of entities that reside in a domain, the query including a request for data relating to energy use. The query can be generated by one or more computing devices belonging to the domain. A selected one of the computing devices can control power consumption for the entities in the domain. In other embodiments, a discovery protocol (DP) and a link layer discovery protocol (LLDP) is used for transporting events regarding the entities that connect or disconnect from the network. The entities send discovery events over a DP/LLDP protocol, identifying them as part of the domain. In yet other embodiments, the method includes querying a selected one of the entities to determine, if the selected entity moved to a certain energy level, an energy consumption value at the certain energy level.

Figure 1:
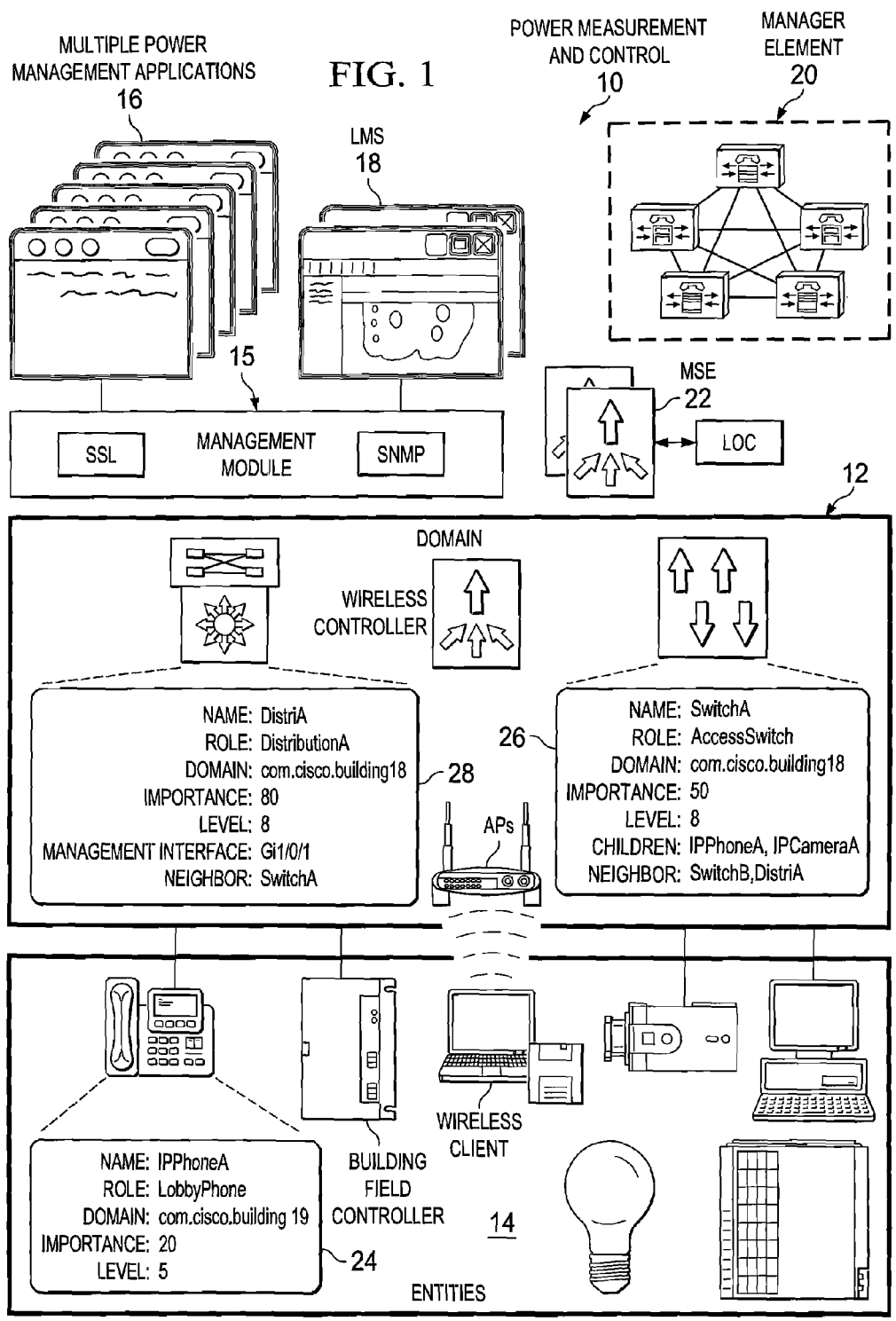
FIG. 1 is a simplified block diagram of an energy management system in accordance with one embodiment of the present invention.

FIG. 1 is a simplified block diagram of an energy management system 10 in accordance with one example implementation of the present invention. FIG. 1 includes a domain 12, which can include any number of devices such as wireless controllers, access points (APs), and switches. Domain 12 is coupled to a number of entities 14, which include any number of devices such as building controllers, wireless devices, telephones (for example, IP telephones), lighting fixtures, HVAC systems, video devices, computers, etc. Domain 12 is also coupled to a set of power management applications 16, a local area network (LAN) management solution [LMS] element 18, a manager element 20, and a mobility services engine (MSE) 22. The devices within domain 12 can be controlled by a management module 15, which is described in detail below.

Energy management system 10 measures power for all connected devices (phones, AP's, PCs, building systems, etc.) and, further, provides command and control for powered devices. From a business perspective, the smart loading capabilities of the architecture allow for a realizable and significant cost savings. Furthermore, energy management system 10 provides a mechanism that understands the power consumption of entities. The architecture can query for power information using the network and, furthermore, implement time-of-day policies to control the entities. In essence, the network acts as a control plane for controlling the energy consumption/usage for one or more devices within a domain. In this sense, the network serves as a platform for energy control.

In more specific implementations, the system can allow network and network-attached equipment to take advantage of a configuration that includes no central processing and no central repository. This also offers the advantage of having no single point of failure. The group in the cloud (i.e., the network) is self-managed, where there is no central control. Management module 15 merely represents a single computing device, which could be located anywhere, as further described below.

Further, the configuration of energy management system 10 is protocol agnostic and virtually any communication transport can be used. The system allows cloud computing to be done to a variable number of entities (all of which may have different types of ASICS, OSs, etc). Dynamically, the endpoints (i.e., the entities) join and leave the heterogeneous environment, where various types of devices can be managed by energy management system 10.

As a stand-alone solution, energy management system 10 enables businesses to monitor and to control the electric consumption of networking equipment. An administrator can monitor devices like switches and routers, as well as LAN switch connected Power over Ethernet (PoE) devices like phones, access points, IP security cameras, door access equipment, etc. Energy management system 10 also has the ability to monitor and to control power of AC powered devices like smart power distribution units, networked building systems, and office equipment. Energy management system 10 also includes an open interface to allow 3rd party management systems to participate in the framework. This simplifies integration of power reporting and automation into existing business practices. Energy management system 10 helps to collect data and aggregates it into actionable information, as discussed herein in this Specification.

Briefly discussing some of the nuances of the architecture, the system can leverage a simple network management protocol (SNMP) and a secure socket layer (SSL) protocol [as part of a management application program interface (API), potentially included in management module 15] to execute some of the functions of example embodiments of the present invention. The management applications can be tailored for particular facilities or for specific IT scenarios. MSE 22 can correlate power data with location. Switches and routers can readily communicate through the management API, where the network can aggregate status and power information. In terms of a client protocol, this element can communicate status and receive policies.

In example implementations, energy management system 10 yields significant cost savings to businesses. An administrator can see where power is used and when it is used. With this information, managers can set flexible conservation policies that match the needs of the business. Moreover, these conservation policies can be automated: making it is easy to conserve on a daily basis. Furthermore, by providing managers with visibility into energy consumption and the tools necessary to conserve power, energy management system 10 enables managers to participate, and in many instances, drive organization level energy-conservation strategies. Energy management system 10 provides power intelligence for network-attached devices allowing the network to act as a control plane for power.

Some solutions in the Fault, Configuration, Accounting, Performance, Security (FCAPS) protocol have focused on managing a single element and assume this scales to managing many elements. However, nothing has addressed coordinating the management of a single or a network of elements. In contrast, example embodiments of the present invention allow administrators to be able to control power for an entire network or a single element. This could ensure an efficient and easy way to control power from a network, sub network, and/or element level.

By way of example, and for purposes of illustration, several sets of data 24, 26, 28 are outlined in FIG. 1. This data reveals the given entity's identification or ID, the entity's role, the domain of the entity, the importance of the entity, its current energy level, its respective management interface, its respective children, and its possible neighbors. Domain 12 can report power data in various forms, for example, reporting power per-wiring closet. In addition, there can be a MIB-summary of power per-switch or per-location. This would allow power and cost savings to be readily determined. Power policies can be sent to the network, where policies are propagated to individual switches. For example, a policy could be propagated to building switches that indicates to shut all phones down in the building at 8 PM. Another example could involve moving HVAC systems to certain levels after the workday has concluded.

Thus, energy system 10 can enable the creation of a domain of networked devices that can be power controlled. Briefly, four aspects of example embodiments of the present invention are hereby introduced. Each component is further described below and, in some cases, references corresponding FIGURES for purposes of explanation. The first aspect to be discussed is the interface, which offers a unique set of data and data processing features. Energy management system 10 can define a set of data and queries, which a member of the domain should maintain [and reply to] in order to be a full member of the domain. This is an interface that a member of the system can implement.

Figure 2:
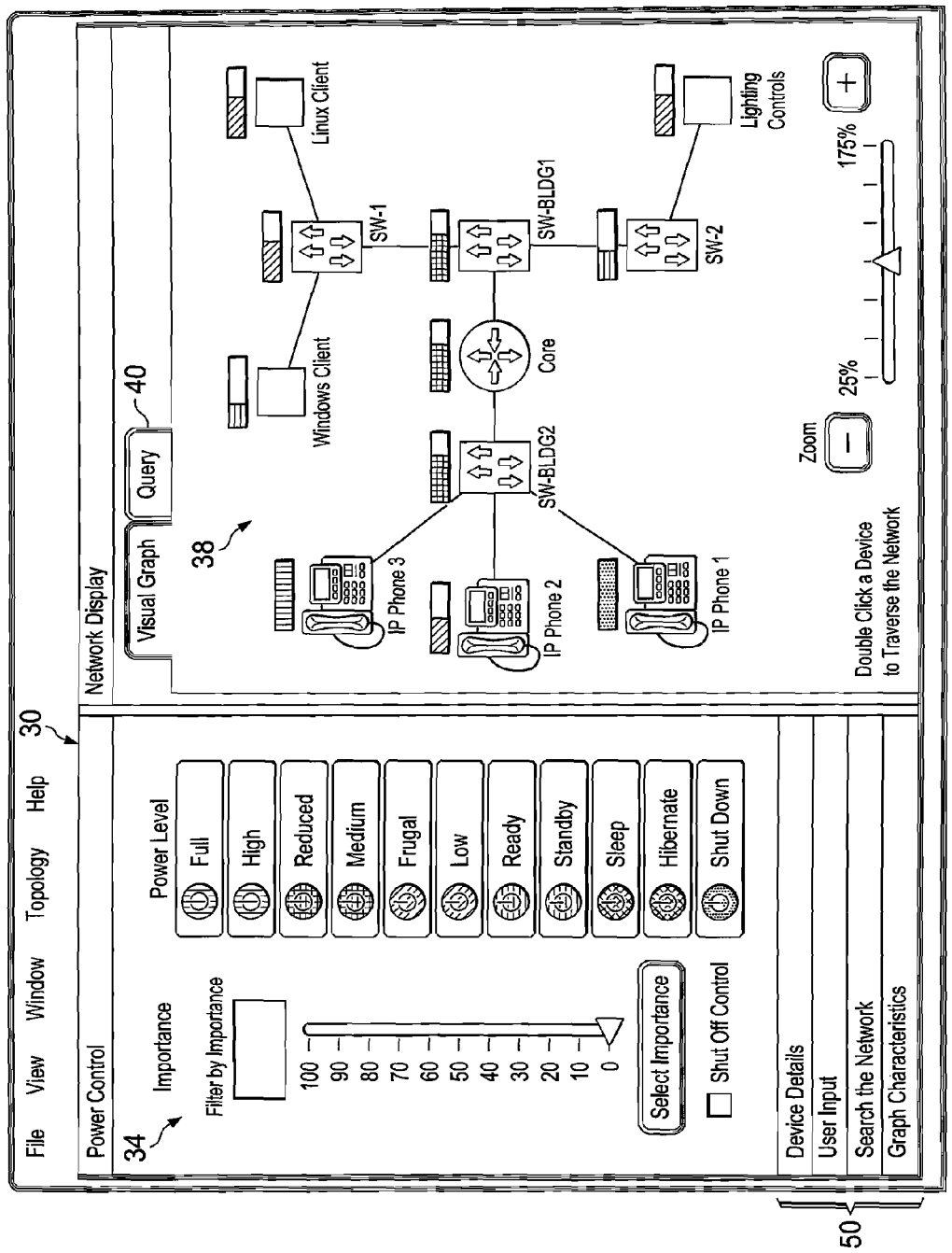
FIGS. 2-8 are simplified screenshots of example interfacing tools in accordance with one embodiment of the present invention.

FIG. 2 is a simplified screenshot 30, which offers one example implementation of an interface. FIG. 2 includes a power level graphic 34, which includes an example set of levels. Note that the network is heterogeneous: meaning that any number of devices (phones, PCs, lighting controllers, etc.) can be included in this environment. The cloud depicted here is also self-organized and dynamic, which allows devices to easily join the network. An administrator can move to the left hand side of the screenshot in order to initiate a query that affects devices on the right-hand side of this illustration.

Also included in this graphic of FIG. 2 is an importance hierarchy, where a numerical representation is offered to demonstrate the device's importance in the system. The importance feature of the system is a way to differentiate between devices in the domain. Importance can range from 0 to 100 in one example, but other ranges can certainly be used. Importance can be used to select devices you want to query or set. For example: An office phone has a lower importance, as compared to a business critical or emergency phone. It is critical that the emergency phone never go into a sleep mode, where the emergency phone's importance is set to a value of 100. By knowing the importance of connected devices, the system can then determine the relative importance of switches in the network.

The priority feature can be thought of as a value set in a query that determines which devices will be affected by the query. The priority (in one example) can range from 0 to 100. Query events can be used to retrieve information (i.e. power usage, etc.) from entities. The transport protocol for events can be a user datagram protocol (UDP) in one example, but this protocol is configurable such that it can accommodate other transport protocols (e.g., TCP). Queries within the network can be delivered hop-by-hop via neighbors encrypted using a shared secret (as further detailed below).

For the management API, there can be two methods for a management application to communicate with the network: SNMP and SSL. The MIB is available on each enabled network device and includes power usage, power policy, alarms, etc. The MIB can give per-device information. Network management systems interested in a network-wide query can use the SSL interface. The SSL interface can allow a single switch to query/set information from/to all switches in a domain.

A query 40 is also illustrated in FIG. 2, along with a graphical depiction of one or more entities that are part of the energy management system. A number of additional tools 50 are also depicted and these items are further detailed in subsequent FIGURES.

Before turning to additional operations of this architecture, a brief discussion is provided how the activities of the platform are executed. In one example implementation, a computing device can include software to achieve the optimal energy management operations, as outlined herein in this document. The computing device can include management module 15, which may further include management applications 16 and/or LMS 18. Some of the computing devices are shown as entities 14. In other examples, that software does not necessarily have to be resident on the computing device itself but, rather, could be included at some other node that can be accessed by a computing device such that the computing device can exercise some control over a given domain. In example embodiments, only network access is necessary for an end user to control energy parameters in a given domain. Furthermore, each entity within the domain may include software (e.g., agent software) that allows it to be controlled via the network.

In other embodiments, the computing device may include any suitable algorithms, hardware, software, components, modules, interfaces, or objects that facilitate these energy management operations. This may be inclusive of appropriate communication protocols that allow for the effective exchange of data or information for achieving energy management in a network environment.

Each of these computing devices can also include memory elements for storing information to be used in achieving the energy management operations as outlined herein. Additionally, each of these computing devices may include a processor that can execute software or an algorithm to perform the energy management activities, as discussed in this Specification. These computing devices may further keep information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

These computing devices could be simple desktop computers. As used herein in this Specification, the term 'computing device' is meant to encompass any devices used to initiate a communication, devices such as a laptop or electronic notebook, switch, gateway, bridge, loadbalancer, firewalls, router, a personal digital assistant (PDA), a cellular telephone, or any other device, component, element, or object capable of initiating voice, audio, or data exchanges within the energy management system. This may also be inclusive of any device that seeks to initiate a communication on behalf of another entity or element, such as a program, a database, or any other component, device, element, or object capable of initiating a voice or a data exchange within the energy management system.

Additionally, one or more memory elements may be included in these computing devices. The memory elements can be used for storing information to be referenced by their corresponding computing devices. These memory elements are inclusive of any suitable database or storage medium (provided in any appropriate format) that is capable of maintaining information pertinent to the energy management operations discussed herein. For example, the computing devices may store such information in an electronic register, diagram, record, index, list, or queue. Alternatively, the memory elements may keep such information in any suitable random access memory (RAM), read only memory (ROM), erasable programmable ROM (EPROM), electronically erasable PROM (EEPROM), application specific integrated circuit (ASIC), software, hardware, or in any other suitable component, device, element, or object where appropriate and based on particular needs.

Figure 3:
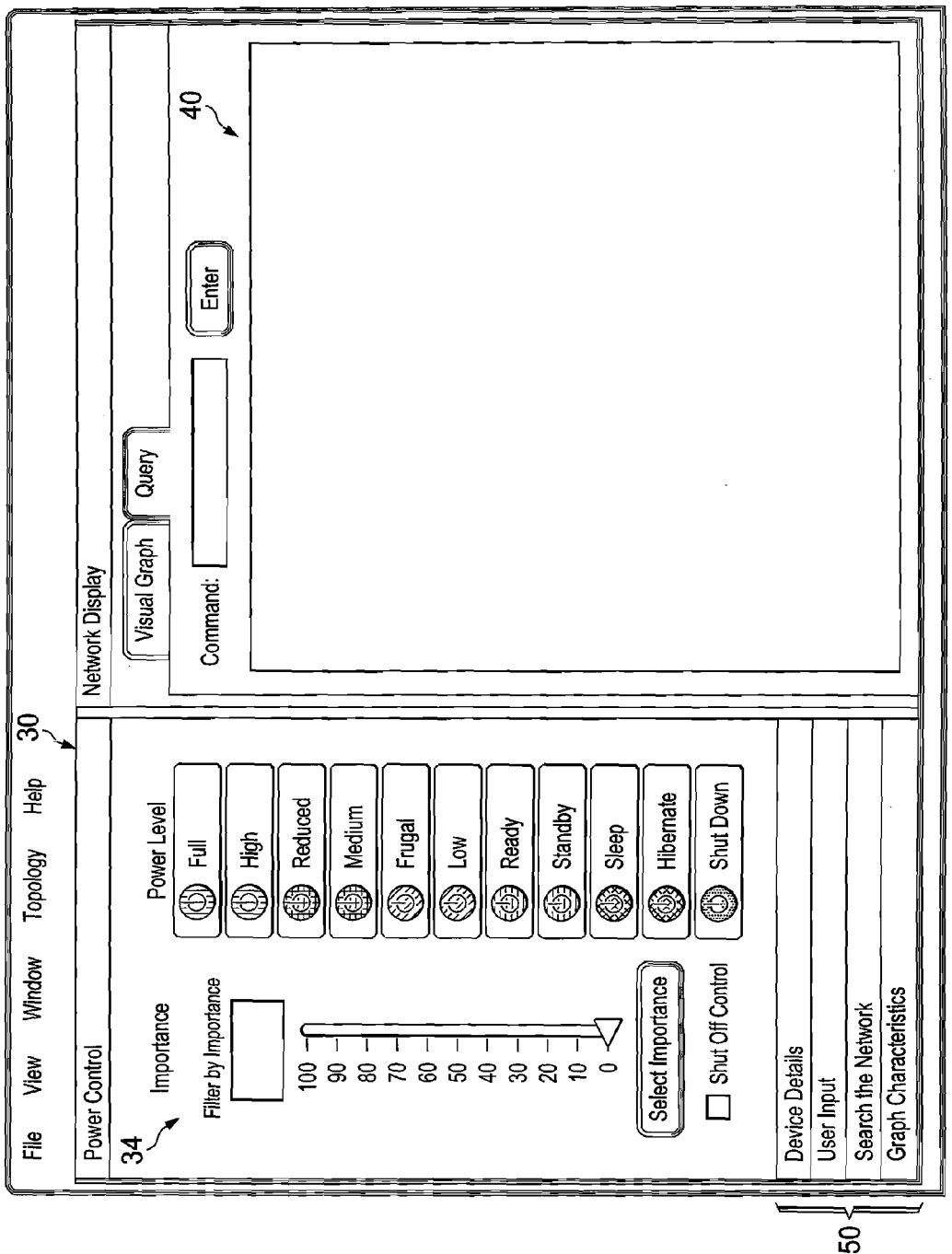
Figure 4:
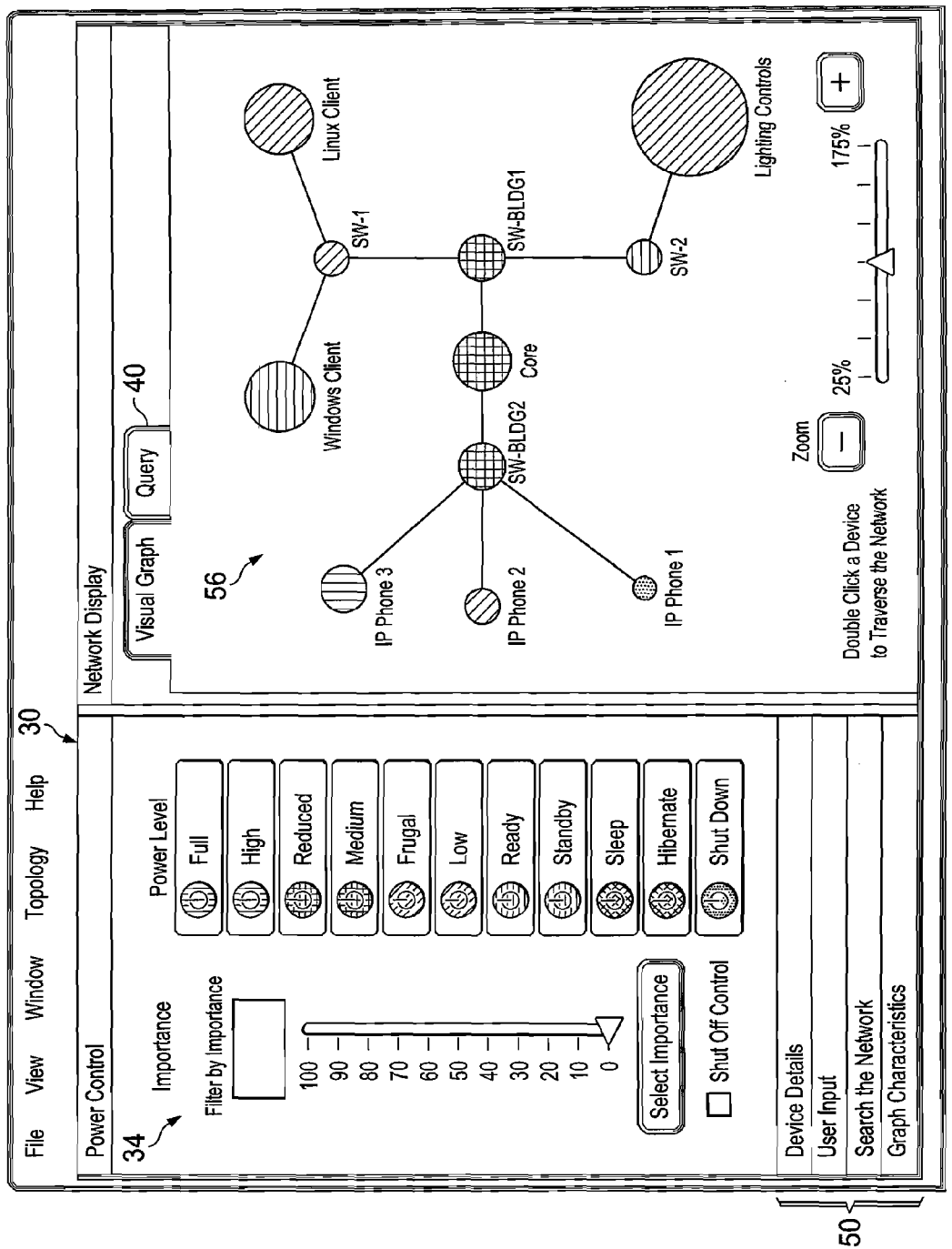
Figure 5:
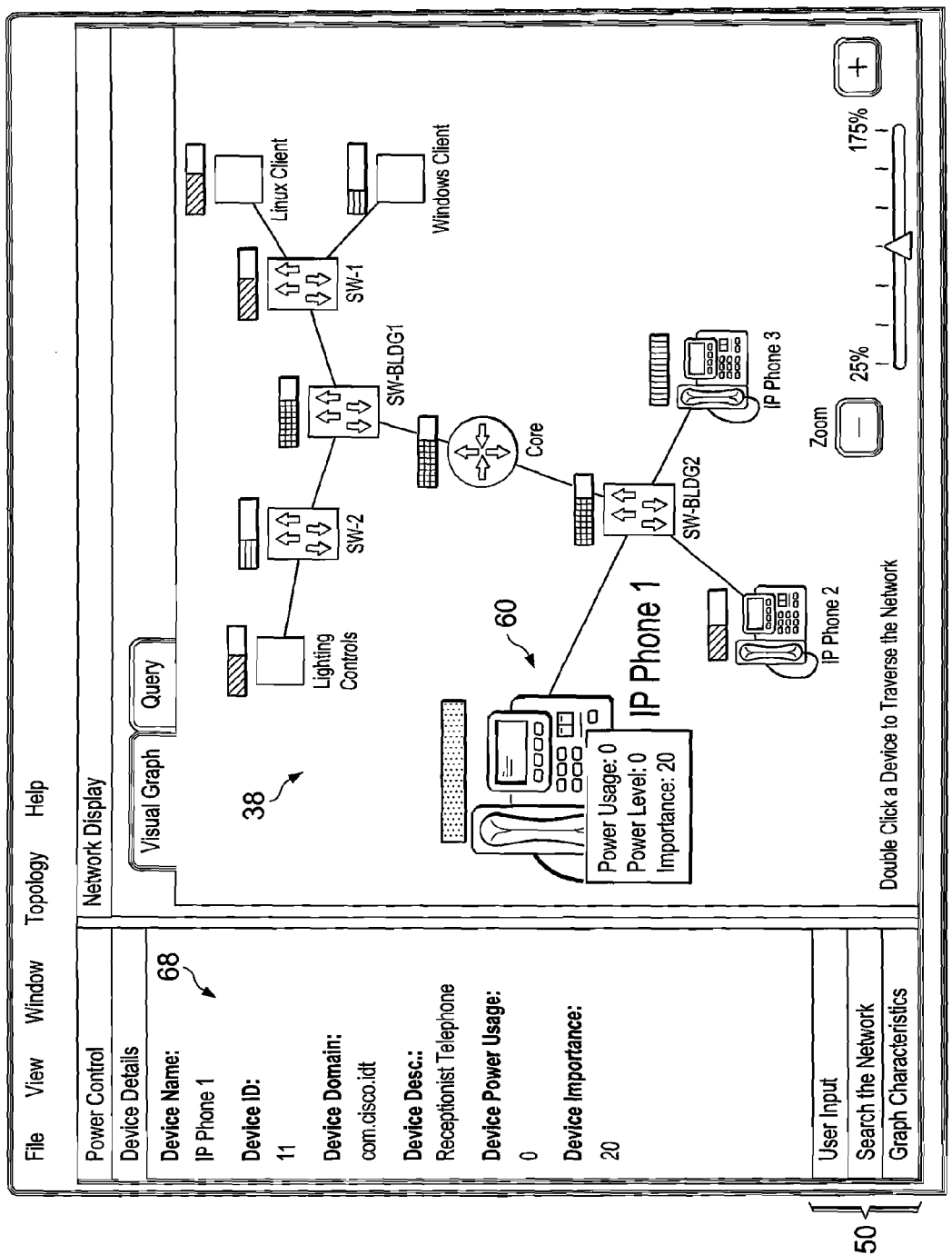
Figure 6:
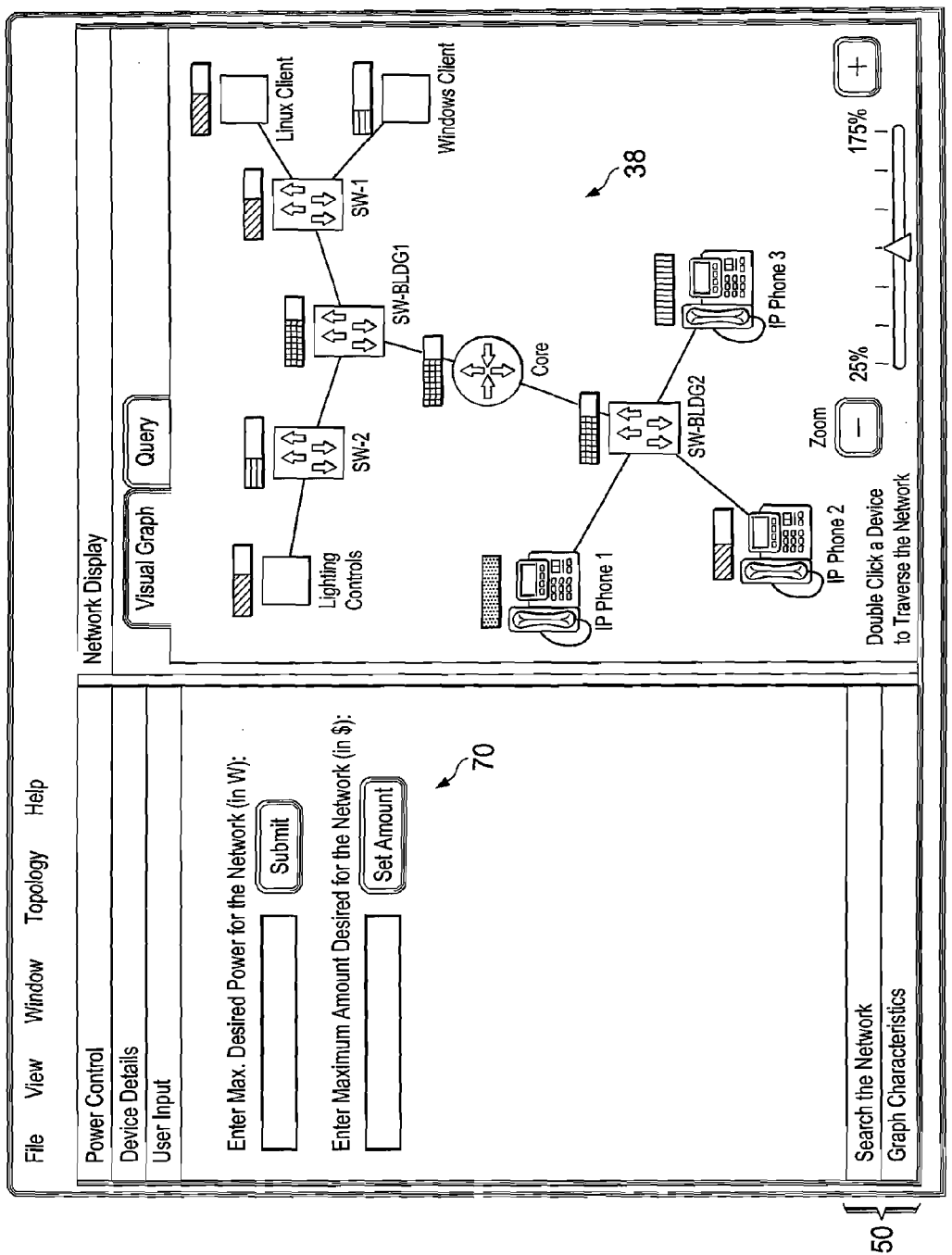

FIG. 3 illustrates query 40, which includes a command feature that can be accessed by an administrator or an IT professional. FIG. 4 illustrates a power consumption graphic 56, which highlights entities that are consuming the illustrated power levels. FIG. 5 illustrates device details 68, which includes information relating to the device's name, its ID, domain, power usage, importance, and a brief description for this particular device. Also illustrated is a specific device graphic 60, which conveniently highlights power usage and the power level for a particular device selected by an end-user. Note that the device details are only providing one example set of possible attributes to be explored by a given end user of the system. Other characteristics, metrics, and features could readily be provided by the interface. FIG. 6 illustrates a user input graphic 70. In this example, the end user is asked to enter the maximum desired power for the network in Watts. The end-user is also asked to enter the maximum amount of power desired for the network in terms of dollars. Again, these possible user inputs are configurable and can be changed considerably, as graphic 70 is only offering one example for purposes of illustration.

Note that energy management system 10 is also capable of executing "what if" processing. The cloud can manage power across a spectrum of possibilities. The architecture can quickly determine a 'delta' and evaluate: What if all devices were changed to _____ level. This offers a net value of a power shedding (or increase), where actual costs are being seen.

Consider an example that is illustrative. An administrator seeking to reduce energy costs may broadcast a query that asks devices: What energy impact would occur if these specific devices changed their current energy levels? Note that each of the enabled devices understands what their power usage would be at certain power levels (hibernate, sleep mode, full, etc.). Thus, continuing along with this example, an IP phone that received this query from the administrator could return a response that indicates that, if the IP phone were to move from a full power level to a standby level, a certain number of watts of power consumption would be reduced. Each device in the cloud (i.e., in the network) would return this vector. The response could be sent back to the console of the administrator as a collection, or it could be collapsed with all other responses to offer a unitary response (i.e., a summation) in any appropriate format. In this sense, each of the devices has calculated their delta, which signifies the potential change from one power level to another power level.

Note that this specificity is important in the context of any number of scenarios. For example, if an administrator were informed that beyond a certain power consumption, rates for energy usage would be higher, the administrator could plan and effectively reduce this anticipated increase. Furthermore, an administrator could also precisely target energy budgets by utilizing such a feature. In other more simplistic scenarios, the administrator could routinely tweak and modify energy settings across the cloud to offer a realizable cost savings.

Specifically, this 'what if' processing feature could involve more granular information. For example, the power level can be thought of as an array. In one example implementation, the power levels go from 0 to 10 [eleven levels], where 0 connotes a shutdown level and 10 connotes full power. In a sense, this range represents an array indexed from 0 to 10. If an enabled device receives a query that asks for power levels and, further, what would be the estimated power consumption at various other levels, the device would return an array indexed from 0 to 10 of what the device would consume at those various other levels. For example, at level 3, the device may consume 30 Watts, while at level 10 the device consumes 215 Watts. Because the device understands (and can readily communicate) power consumption at various levels, it can quickly respond to a query and provide that delta (i.e., change) if it were to move to a different level. Thus, the device can respond intelligently to a query and provide that delta metric, which represents the change from a current level to some other specific power level. Furthermore, this can occur across the cloud such that an administrator would be able to see a collection of such responses, or a summation of these responses [a net resultant], that would empower the administrator execute intelligent decisions about energy usage.

Figure 7:
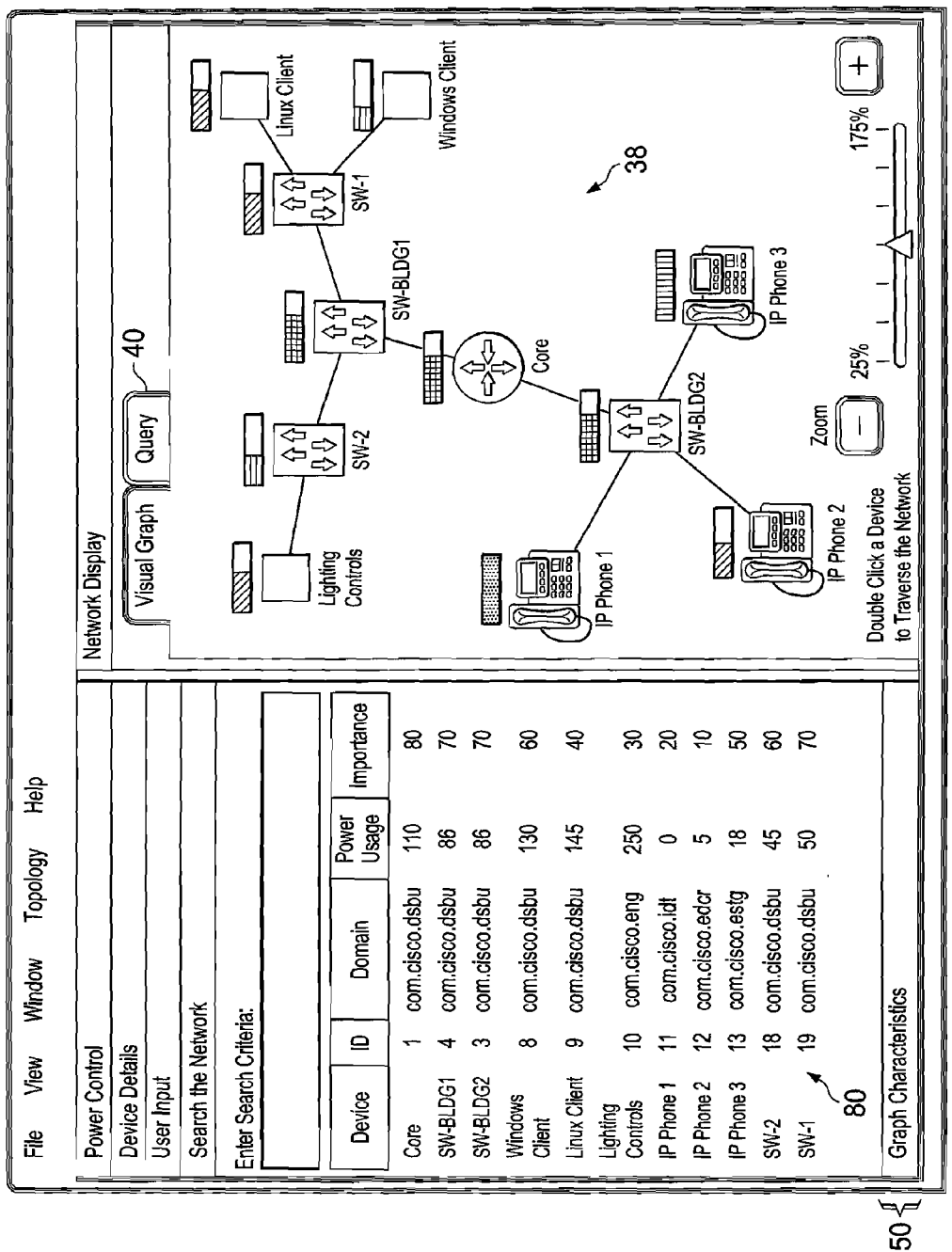
Figure 8:
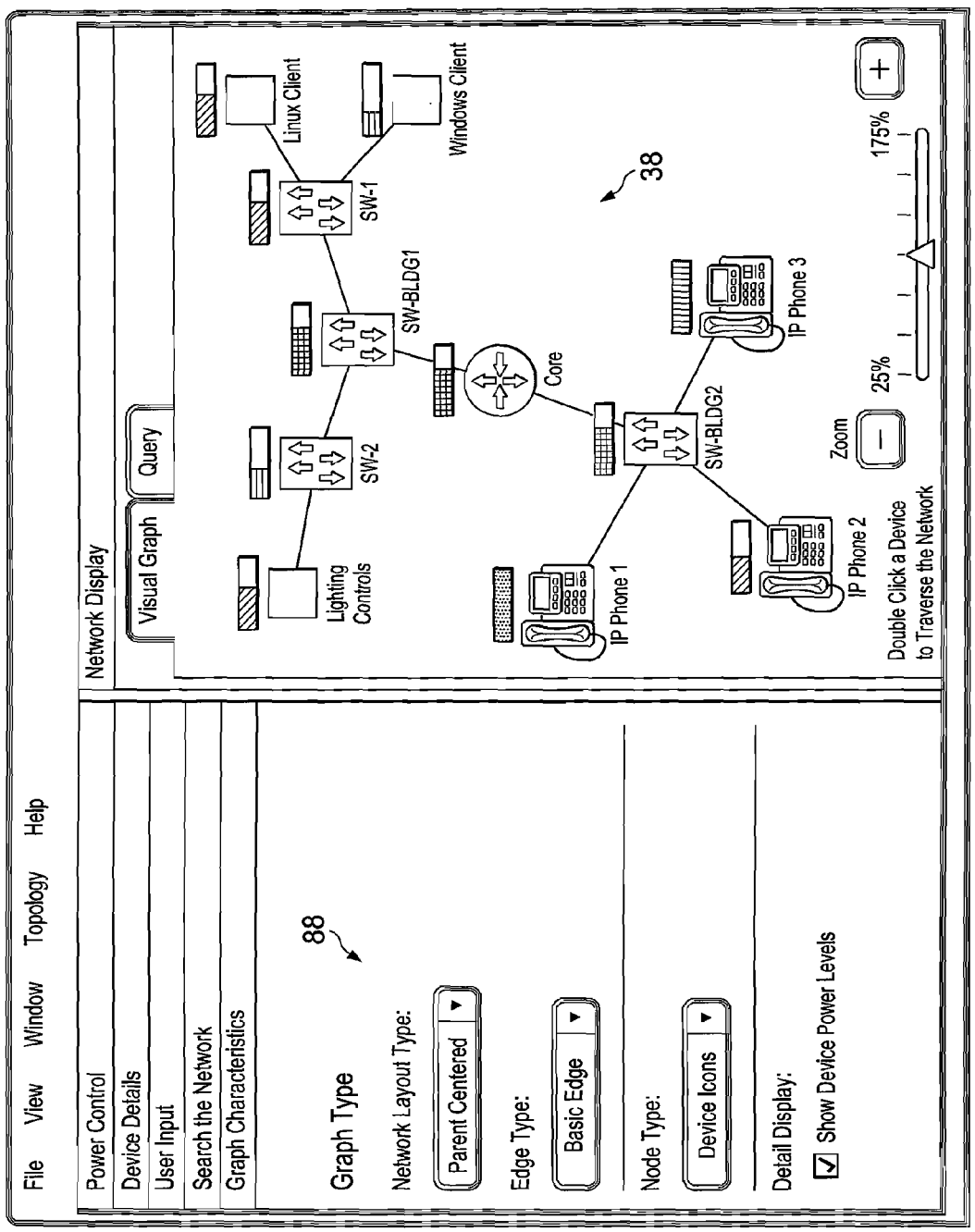

FIG. 7 illustrates a search graphic 80, which allows an end user to input search criteria for finding devices in the network. This could be part of a specific request, or a particular scenario that an end-user envisions for his set of devices. FIG. 8 illustrates a graphic characteristics tool 88, which can be used by an end-user to graphically explain power consumption in this particular network. In this non-limiting example, the graphic includes a network layout type, an edge type, a node type, and a detailed display option.

In regards to usage levels, there should be a consistent language for describing power usage. Describing the power usage in terms of Watts is straightforward, but simply knowing that does not indicate the state of the device. Is the device on or off? Is it using power full out? Is it in a lower power mode? Energy management system 10 offers a clear and uniform way to describe the current power setting. This can be achieved by defining levels as a table of levels that are numbered, labeled, colored, and/or categorized. With these levels established, administrators can converse about devices or the network being set to Green, High, Low, Standby, Non-Operational etc. in a consistent way.

An end user of the system can determine how best to set their products at the given level. For example, the level Standby may mean something different to a switch, to a phone, or to an access point. Thus, energy management system 10 can define the levels (the interface) and leave the interpretation (the implementation) up to the devices that wish to be full members. In regards to an individual entity, the system can identify the smallest unit of power management. In one example, the entity is defined as any part of a network that provides or draws power to another part of a network. Each entity can have a unique ID, where the system can track information about the entity. The information being tracked (the fields of the data) can include a set of attributes. The attributes can be information about the entity such as usage, name, importance, etc.

Thus, a switch [as well as all its ports/interfaces] can be an entity since the switch draws power and the interfaces provide power. A device such as a phone or an access point is an entity because it draws power. Entities can contain other entities in a parent-child relationship. Thus, a switch can be seen as a parent for all its interfaces or children. Some attributes on a parent can apply to the children: things like location, and domain, as detailed below.

In regards to domains, roles, and naming hierarchy, a network can be viewed as a collection of entities. In order to manage this collection of entities, they can be divided into manageable sets. Each entity can belong to a single domain. Entities in a domain can communicate with each other and can be viewed as one unit of power consumption. The system can maintain a shared secret for all entities of the domain to determine membership and keep the communication between entities secure. The system can also use a naming hierarchy containing: {Domain+Role+Name}, which can allow the system to reference elements specifically by name or using a wildcard notation for groups of entities. For example, the system can label access switches of a building in Domain: com.XYZ corporation.bldg19.

The role of the device is an indication of what purpose it serves in the network. The system can default this to the type of device and allow the value to be changed so that administrators can indicate the usages. For example, a switch and phone might have a role of switch and phone. The role could be set to Lobby-Switch or Lobby-Phone.

Finally, all entities can have a Name that can be assigned. An ID can uniquely identify an entity, whereas the Name gives it a human readable tag. For example, the system can have switches deployed to a lobby named LL and LR and a phone in the lobby called PR. When the system imposes its hierarchy of naming on the examples, the system can have full names for entities such as:

com.XYZ corporation.bldg19.LobbySwitch.LL
com.XYZ corporation.bldg19.LobbySwitch.LR
com.XYZ corporation.bldg19.LobbyPhone.PR The system can then refer to sets of entities using a wildcard notation such as:

com.XYZ corporation.bldg19.
*[All entities in bldg19]; and
com.XYZ corporation.*.LobbyPhone.
*[All lobby phones in domain com.XYZ corporation.]

In terms of importance metrics, one goal of the system is to manage power on a network level. Once the system has grouped elements into a domain, the system can set the context for an entity. To this end, the system can implement the importance scheme, as described in U.S. Pat. No. 7,084,752, which is hereby incorporated by reference herein. That design outlines a way to assign and compute the relative importance among devices in a network. The system can track importance as an attribute of all entities.

By way of example, and to briefly summarize, assume the system has two phones deployed in an enterprise. One phone is in a shared office and one is used by a trader generating a lot of money as part of the core business for the enterprise. Clearly, the system can see one phone is more important than another is. What may not be obvious is that the devices and services that support that trader's phone are now more important amongst the other entities in the network. Assigning a business context importance to a device can change the importance of other devices in the network. The calculations the system uses can allow the system to identify the switches and services that support the important devices and, further, weight them as more important to the network as a whole. When used in conjunction with levels, the system can provide choices for administrators and applications for power usage in the network. Importance tracking also allows the system to broadcast requests to devices indicating a priority. Each entity can evaluate the priority against their relative importance attribute to determine if any action should be taken.

Turning now to a second aspect of example embodiments, this feature addresses relationships, which can offer a parent-child relationship between devices. Energy management system 10 can define a parent-child relationship between members so that some devices can act on behalf of others. A child may not be a full member of the domain (i.e., may implement some of the things in the interface). Energy management system 10 can specify a method to allow a parent to act on behalf of a device for all or a selection of features of the interfaces. This could be accomplished through a nanny vector concept, which represents a vector of features a parent can implement on behalf of a child.

Specifically, the system can have some entities act on behalf of connected devices. Thus, the system introduces the notions of Parent, Child, and Proxy. Consider a switch, which is an entity. If the system tells a switch to set itself to a Green Level, the system expects it to adjust its own power. The system can also specify how the switch handles the things that are connected to it. The system allows any entities connected to this switch to also adjust as well. There are a few scenarios worth exploring, such as: What if the connected entity is compatible? What if the connected entity is not compatible but is drawing power? What if the system wants to translate the event into another format and pass it along?

Energy management system 10 can have the switch (i.e., an entity) maintain a list of neighbors and each entity can record its respective parent. By looking through its list of neighbors, an entity can tell which neighbors are its children. In one example implementation, neighbors can be entities the system forwards events to and the system can simply forward the events so that queries can propagate. Children are entities that the system acts on behalf of in certain example scenarios. If the system, as the parent, gets an event and the system has a compatible child, the system can forward the event to it and let it handle it. If the system has a non-compatible child, the system acts on its behalf in certain example scenarios. Thus, the system adjusts its power and/or reports its usage, etc. The system can also look up the features the system is to implement on behalf of the non-compatible child and get a vector of features, which can be thought of as a 'nanny vector.' The parent can check the nanny vector and implement a feature(s) on its behalf if the vector indicates it.

Further to this neighboring relationship, devices in the domain can maintain a listing of their connected neighbors. The system can forward queries from any member in the domain to all members of the domain. This allows the entire domain to be viewed as one device.

Actions should be taken for each query (or event). The base code is used to dictate the power actions. However, each individual vendor could configure his own device. For example, the printer could interpret Level 11 as a "Full Power" for the Hewlett Packard 5600 Series Printer and Level 2 as a "Standby" mode. In this sense, the translation of what to do [based on some event] is somewhat proprietary and can be defined by each manager of the device.

The third aspect of example implementations of the system addresses a plug-in method for normalizing devices. Energy management system 10 can define a method for allowing the interface to be translated into other interfaces that may exist on devices. For example, older protocols like BACNET or SNMP can be leveraged. This allows the architecture to normalize the heterogeneous devices on the network.

In example embodiments, a child can be configured as a proxy such that, instead of passing the event or acting on its behalf, the system forwards the event to a class of scripts. This can allow an interface on a switch to be configured as a placeholder for a translation that can be scripted via scripts. This could involve being used for a class of scripts that can translate and forward the event into appropriate formats (e.g., BACNET). This allows such a feature to be used with other non-networking devices that draw power (e.g., lighting and building controllers that are not likely to convert to a format in the reasonable future).

The fourth aspect of example implementations of the system involves a query, which could involve a distributed query processor. In one example, all devices in the domain maintain a listing of their connected neighbors. The system can forward queries from any member in the domain to all members of the domain. This allows the entire domain to be viewed as one device.

More specifically, once the system has a domain of entities that are tracking their attributes, the system needs a way to communicate with the entities. There are various types of communication messages: An entity connecting to the network (Discovery); One entity notifying the others in the domain about significant changes (Event); Asking for information from one or more entities (Query); and Setting information on one or more entity (Query). The system can define an event format that the system can use as the base for all communications.

In one example implementation, communication between entities is done via an event. The system can have a generalized event format, where the system can use that for basic notifications. The system can then have subsets of events that the system uses for discovery and queries. The format of the event can be at the classic application level, independent of the transport method in one example embodiment. The transport protocol used for event delivery can be neutral.

One example implementation involves using a discovery protocol (DP) and a link layer discovery protocol (LLDP) for transporting events regarding entities that connect or disconnect from the network. The system can use UDP (e.g., encrypted with the shared secret from the domain) for event delivery. Only entities in the domain with the correct shared secret can be able to decrypt and read the event in accordance with one example implementation. Note that there are many different products and customers with various deployment types. The transport protocol of the system should be neutral so that the system can support the wide variety of product and deployment types. In one example, the system can provide this specification over DP/LLDP and UDP leaving the implementation over other protocols as a development exercise. For deployment over the switching products, the system can make the transport protocol configurable.

In regards to queries, a general power query (PQR) can be implemented. The system introduces a way of communicating with one, some, or all entities in a domain. Note that the system needs to communicate with one or more entities at a single moment in time, while not relying on a central server to provide this feature. The system has specific and global control over the entities. The system can also get or set information from one or many entities and adjust the usage for one entity or perhaps tell an entire group of entities to set to a specific level. Asking for, or setting information, on an entity can be done via a query mechanism. In one example, the system broadcasts a query to all the devices in the domain.

The system can use the PQR and the outlined response mechanisms for all queries. The power query is a generic querying mechanism, which can ask all entities for the value of some attribute, for example. Querying for power usage or something specific to an entity would be embodied in such a query. For example, from any switch in the domain the system could be able to ask: What is your current usage? What is the current usage of the entire domain? What is the usage for a subset of the domain?

The PQR mechanism can allow the system to view the domain as a group of entities and communicate with one or all of the entities. The system can send a query as a point-to-point query or as a logical broadcast to the entities. The PQR feature will [through discovery events, neighbor tables, and the algorithms implemented on the supporting entities], provide a query service that logically resembles a broadcast to all devices and a natural reply to the sender. Whenever an entity asks for information, the system can send an event. If the event is addressed to a specific entity, that entity alone can reply to the event. If it is sent to more than one entity, each entity can reply if appropriate, and then forward the event to its neighbors. The sender of the request can specify if they would like the replies collected or summed as a response.

For example, the system could query all switches, ask for their usage, and get a list of IDs and usage (Collect). The system could also ask for usage of all switches and get a reply that is one number: representing the sum of all the usages (Sum). Moreover, the system offers the ability to issue these queries from any switch (or device) in the domain. The PQR allows the system to view the entire network as one entity, or as many entities.

In regards to the discovery for query propagation, the system can use DP and LLDP to identify an entity joining a domain. A device implementing the energy protocol can report their connection to the network via DP/LLDP in one example embodiment. These devices can send a discovery event over DP/LLDP that identifies them as part of a domain. The event can also contain appropriate version information so the system can know what release of the protocol the entity is implementing. DP/LLDP can be used for physically connected entities. The system can also use UDP broadcast as well as DP/LLDP broadcast when an entity connects to the system. This can allow network and physically connected entities to maintain neighbor connections. Entities can maintain neighbor information gathered from the discovery.

In regards to policy setting via queries that recur, one of the ways the system can manage a network of entities is to specify a policy and let the entities themselves adjust according to the policies. A policy is a way of telling an entity to adjust according to some criteria (time, for example). This would allow all switches controlling devices in branch offices going to a standby mode at 8 pm and then moving back to full power levels at 7 AM.

The system can view policies as simply events that recur. Thus, the system can send out an event that instructs one or more entities to set to 'Level Standby' and, further, specify the recurrence of that event. Any entity receiving the event can act on the event at the times specified by the recurrence (e.g., until cancelled). On a related note, by combining the proxy features of a parent and the ability to send recurring events, a non-compatible device could ask a parent to act on its behalf with a recurrence. In one example implementation, some type of management application element can send an event to a parent switch and ask for it to set its level at recurring times. In this way, the system can implement policies for entities from a compatible switch.

Given the query concepts outlined above, the system has a language for asking the network for information or asking it to set to a state. For example, the system can ask and instruct entities as follows:

What is the power consumption of this switch?

.QUERY.SUM attribute usage domain com.XYZ corporation.bldg19.LobbySwitch.LR
What is the power consumption of a domain?
.QUERY.SUM attribute usage domain com.XYZ corporation.*
What is the individual power consumption of entities in a building?
.QUERY.COLLECT attribute usage domain com.XYZ corporation.bldg19.*
How much power are lobby phones consuming?
.QUERY.SUM attribute usage domain com.XYZ corporation.*.LobbyPhone.*
Set all the unimportant devices to standby.
.QUERY.SET attribute level=stand-by domain com.XYZ corporation.*.LobbyPhone.* priority 30
Set all unimportant devices to standby at 8pm and full at 7am
.QUERY.SET attribute level=stand-by domain com.XYZ corporation.*.LobbyPhone.* priority 30 recurrence M-F 8:00pm
.QUERY.SET attribute level=Full domain com.XYZ corporation.*.LobbyPhone.* priority 30 recurrence M-F 7:00am The plug-in type model allows the system to proxy legacy power controlling devices, where their values are added to the computation, which gives a normalized view of the network. The query method of the system allows for processing values from a network: much like a set of equation summations for a network view of power settings and changes. Use of an importance calculation allows the system to combine a unique query mechanism with the importance calculation to express power settings with the context for which they are deployed.

In terms of the specific formatting of the query, one example format could be as follows:

Query

| Application | Energy Management Protocol |
|---|---|
| Class | QUERY |
| Action | SET\|SUM\|COLLECT\|INVENTORY |
| PayloadMap | Keys are entity data name and value pairs |

[For example: Sent out by entities wishing to get or set information from the domain or a specific entity.]

Query.Inventory

| Application | Energy Management Protocol |
|---|---|
| Class | QUERY |
| Action | INVENTORY |
| PayloadMap | Keys are entity data names |

In response to an Energy Management Protocol.QUERY.INVENTORY, all receivers can respond with a payload of Energy Management Protocol_NEIGHBOR_COUNT and Energy Management Protocol_NEIGHBORS.

Information

| Application | Energy Management Protocol |
|---|---|
| Class | NOTIFY |
| Action | CREATE\|UPDATE\|DELETE |
| PayloadMap | Keys are entity data names |

This could be sent out by entities wishing to notify changes no reply is necessary. Receivers act upon the event as dealer's choice. Any change to importance can be sent as an update.

Reply

| Application | Energy Management Protocol |
|---|---|
| Class | REPLY |
| Action | DONE\|DID NOT |
| PayloadMap | entity name and value pairs must contain the Energy Management Protocol _EV_SEQUENCE of the query |

This is the reply event sent for all queries. The action indicates if the query was processed or not. In the case of 'DID NOT', an appropriate reason payload can be provided.

ACK

| Application | Energy Management Protocol |
|---|---|
| Class | ACK |
| Action | WILL \| WILL NOT |
| PayloadMap | entity name and value pairs must contain the id of the query |

Upon receipt of a query, the entity can respond with an ACK. WILL indicates the query can be honored and a value returned. WILL NOT indicates the query did not apply to the receiver because of priority/importance conflicts. If the domain does not match, then there is no reply.

Discovery

| | |
|---|---|
| Application | Energy Management Protocol |
| Class | DISCOVERY |
| Action | UPDATE | KEEP ALIVE |
| Payload: | |
| Version | Energy Management Protocol version that the device is compatible with |
| Role | TLV |
| Domain | TLV? |
| Capability | TLV? |
| Importance | TLV |

Discovery and keep alives are processed with no ACK required. For the DP/LLDP mechanism, when a device starts and connects as part of its normal DP processing it should send an Energy Management Protocol.DISCOVERY.UPDATE event to its neighbors. In response, the receivers should update their neighbor tables and return the receivers Energy Management Protocol.DISCOVER.UPDATE event.

For UDP, when an enabled device starts and it is not DP/LLDP enabled, it should send an Energy Management Protocol.DISCOVERY.UPDATE as a UDP broadcast and the clear TTL is 1. For the nanny vector, connected devices can indicate which nanny vector they want enacted on their behalf. The nanny vector is a way for a switch to provide features for a connected device.

The table below indicates example settings and the enumeration of those settings. Each row can indicate the feature the switch can provide. A one [1] in the column indicates the switch can provide for the connected device if an event indicates a set to that level. For wake-on-LAN (WOL), the switch can provide for providing a pseudo WOL function. If no nanny vector is supplied, then the assumption is NONE (0).

| Name | enum | WOL | 0 | 1 | 2 | 3 | 4 | 5 | 6 | 7 | 8 | 9 | 10 |
|---|---|---|---|---|---|---|---|---|---|---|---|---|---|
| NONE | 0 | 0 | 0 | 0 | 0 | 0 | 0 | 0 | 0 | 0 | 0 | 0 | 0 |
| ALL | 1 | 1 | 1 | 1 | 1 | 1 | 1 | 1 | 1 | 1 | 1 | 1 | 1 |
| WOL ONLY | 2 | 1 | 0 | 0 | 0 | 0 | 0 | 0 | 0 | 0 | 0 | 0 | 0 |
| OPNOP | 3 | 0 | | | Evaluate as Operation, Standby, non-Operations | | | | | | | | |
| WOL OPNOP | 4 | 1 | | | Evaluate as Operation, Standby, non-Operations | | | | | | | | |

For proxy processing, when propagating an event to a neighbor that is a remote proxy, the system can:

1) create an event with cookie, application, class, action, and payload; and

2) Execute from IOS the same library call that an embedded event manager (EEM) uses for event_send and send the event in the clear with event_type proxyclass.

Any EEM listener script that subscribes to the proxy class type can receive the event. To aid the listener script, a library can be added. In terms of cookies, for the Energy Management Protocol_SEND (cookie, text), the system can send text string to the addressee of the event known by the cookie. For the Energy Management Protocol_REPLY (cookie, payload), an ACK is sent to the addressee of the event known by the cookie and, further, the key value payload is sent to the addressee known by the cookie.

For the importance notify, the system can process importance according to one or more algorithms. If the Intrinsic (Energy Management Protocol_IMPORTANCE_I) is changed, then a check is performed to see if it is greater than the maximum seen. If so, a notification is sent to that particular domain, as the new maximum importance. If the new importance is less than the maximum, but that entity is the maximum entity, a notification of a new maximum is sent. If a notification of a new maximum is received, a check is performed to see if it is greater than that particular entity. If so, this is set as the new maximum. If that individual entity is greater than the notification, a notice is sent to the domain that you are the new maximum.

For UDP processing, IP connectivity amongst devices is leveraged for communication. The UDP discovery can rely on a UDP broadcast with a TTL=1. A network administrator can determine the broadcast domain allowable for discovery. For broadcasts to propagate, a network administrator can configure their network devices such that broadcast can pass through. For IOS, the command could be "ip forward-protocol spanning-tree" or "ip forward-protocol udp<Energy Management Protocol-PORT>". This can help the energy management protocol dynamically keep the list of active devices in the protocol itself. To span a domain across two broadcast domains, the Energy Management Protocol allows an administrator to configure static neighbors. Alternatively, UDP discovery can be turned off, which stops the energy management protocol to figure out devices joining/leaving a domain dynamically.

In terms of configuration and restrictions, a device can be configured with an SSL port to accept queries. A device can execute queries on behalf of the SSL connected peer and return the result. The SSL port can be inactive by default. If an interface is configured as a proxy, it could be configured with a host and port where translated events can be sent. An event of some type (e.g., embedded event manager (EEM)) could be available for an interface to be run as a proxy. In order for neighbors (that are not physically connected [i.e. connected via an IP cloud, but considered neighbors in the domain for query processing]) to be discovered, UDP can be permitted. The UDP discovery uses UDP broadcast with TTL=1. A network administrator can determine the broadcast domain allowable for the discovery.

In regards to specific power classes, the following power classes could be used:

1. Health and Safety: Full Power Awake is the default configuration. (Smoke detectors, 24/7 security cameras, etc.).
2. Mission Critical 24/7: Full Power Awake is the default configuration (CEO's phone, access readers).
3. Mission Critical During Operating Hours: Full Power Awake is the default—but Low Power Awake may be used.
4. Standard Operations.
5. Best Effort: Snooze or Sleep may the default configuration.

For more specific acronyms and abbreviations, which could be used in example implementations of the present invention, the following could be employed: Power Operating Mode (POM): Powered Devices (PD), Power Controlled Devices (PCD), and Proxy Ports (PP), which may operate in several Power Operating Modes (POMs). These modes may include:

1. Full Power Awake;
2. Low Power Awake (affects screen brightness, volume, etc.);

3. Snooze (the device is actively listening to the wire, but does not need to boot—for fast response);
4. Deep Sleep (the device is actively listening to the wire, but does not need to boot—for slow response); and
5. Power Off (The device is completely powered down. When powered, it can boot).

For a Power Operating Mode Change Trigger (POM Trigger), this is a signal that alerts the switch to tell the enabled devices or proxy port to change Power operating modes. A clock may trigger night settings. This could cause devices to go into sleep mode, or whatever mode is deemed appropriate for the device's class. POM triggers may come from the network, or in the case of a phone or kiosk, they could come from user input onto the attached device (such as touching the screen or picking up a handset).

More specifically, for POM triggers, the following could be deployed:
1. Demand Response signal from the power utility. A demand response signal tells attached PDs to reduce power consumption. This may marginally reduce performance without significantly impairing the application—that depends on the Power Operating Mode the device uses and the impact that mode has on the PD. For instance, on a phone, Low Power Awake may reduce screen brightness.
2. Time based trigger (end of workday).
3. User input (end user touches a keypad, screen or handset).
4. Sensor based (presence sensor, dry contact, temperature, light, sound etc.).

For enabled PDs and PCDs, the following table could offer an example configuration.

For power-controlled devices used by the management system platform, these devices are network attached. The system includes a handshake mechanism between the switch and the device. One intricacy here is sending power operating mode change triggers to the devices. The switch can know how much power the end device consumes in each power-operating mode. The devices can include, for example, room lighting controller and attached lights, building HVAC, refrigeration equipment, large TVs, and automatic window blinds.

In regards to specific porting, switch ports may be assigned to a proxy port type. Certain devices can be configured in two classes: mission critical and best effort. Mission critical can always have a maximum power available. Best effort may be shut down after receiving a time trigger. Network administrators can have the ability to define device classes and power operating modes associated with those classes. Manufacturers can define device behavior in each supported power-operating mode. Administrators can set time-of-day triggers for certain device classes.

Each enabled switch is able to show the aggregate power consumption of attached devices. It can also display the power saved at any given time. That is, it should show the difference between what is being used versus what could be used by the attached devices. Each switch should be able to show the amount of power being used by PCDs. Administrators can input this data or the system could get it from the PCD device by working with the manufacturer. For instance, a digitally controlled light may use 100 watts, but when attached to a switch in a power-save mode, it may only use 50 Watts and the system can show the savings.

| | Devices | Type | Class | Full Power | Part Power | Snooze | Sleep | Off |
|---|---|---|---|---|---|---|---|---|
| 1 | Phones | PD | HS | Yes | Yes | Yes | | Yes |
| 2 | Access points | PD | | Yes | Yes | | | Yes |
| 3 | Cameras | PD | | Yes | | | | Yes |
| 4 | PTZ Cameras | PCD | | Yes | | | | Yes |
| 5 | PTZ Controllers (joystick/switching interface) | PD | | Yes | Yes | | | Yes |
| 6 | Infrared Cameras | PCD | | Yes | | | | Yes |
| 7 | Microphones | CPP | | Yes | | | | Yes |
| 8 | Card readers | PD | | Yes | Yes | | | Yes |
| 9 | Kiosk thin clients (for bldg auto) | PD | | Yes | Yes | Yes | Yes | Yes |
| 10 | Kiosk thin clients (Security and ambassadors) | PCD | | Yes | Yes | Yes | Yes | Yes |
| 11 | Voice conferencing phones | PD | | Yes | Yes | | | Yes |
| 12 | RFID antennas | PD | | Yes | Yes | | Yes | Yes |
| 13 | Building Edge controllers | PD | | Yes | Yes | | Yes | Yes |
| 14 | Room controllers (thin client) | PD | | Yes | Yes | | | Yes |
| 15 | Room conferencing devices (polycom) | PD | | Yes | Yes | | | Yes |
| 16 | Conference room switch (PoE powered) | PD | | Yes | Yes | | | Yes |
| 17 | Broadcast speakers/paging speakers | PD | | Yes | Yes | | | Yes |
| 18 | Presence detector | CPP | | Yes | Yes | | | Yes |
| 19 | Smoke detector | PD | | Yes | Yes | | | Yes |
| 20 | CO2 detector | CPP | | Yes | Yes | | | Yes |
| 21 | Glass break detector | CPP | | Yes | Yes | | | Yes |
| 22 | Vibration detector | CPP | | Yes | Yes | | | Yes |
| 23 | Digital signage controller | PD | | Yes | Yes | | | Yes |
| 24 | Biometrics, access key reader | PD | | Yes | Yes | | | Yes |
| 25 | Crash bar lock/unlock | PCD | | Yes | Yes | | | Yes |
| 26 | Clock | PD | | Yes | Yes | | | Yes |
| 27 | Gas meter | CPP | | Yes | Yes | | | Yes |
| 28 | Temp sensor | CPP | | Yes | Yes | | | Yes |
| 29 | Network controlled variable lighting switch etc. | PCD | | Yes | Yes | | | Yes |
| 30 | Other sensors etc. | CPP | | Yes | Yes | | | Yes |
| 31 | "Multi-Drop Variable Volt Hub" | PD | | Yes | Yes | | | Yes |

Figure 9A:
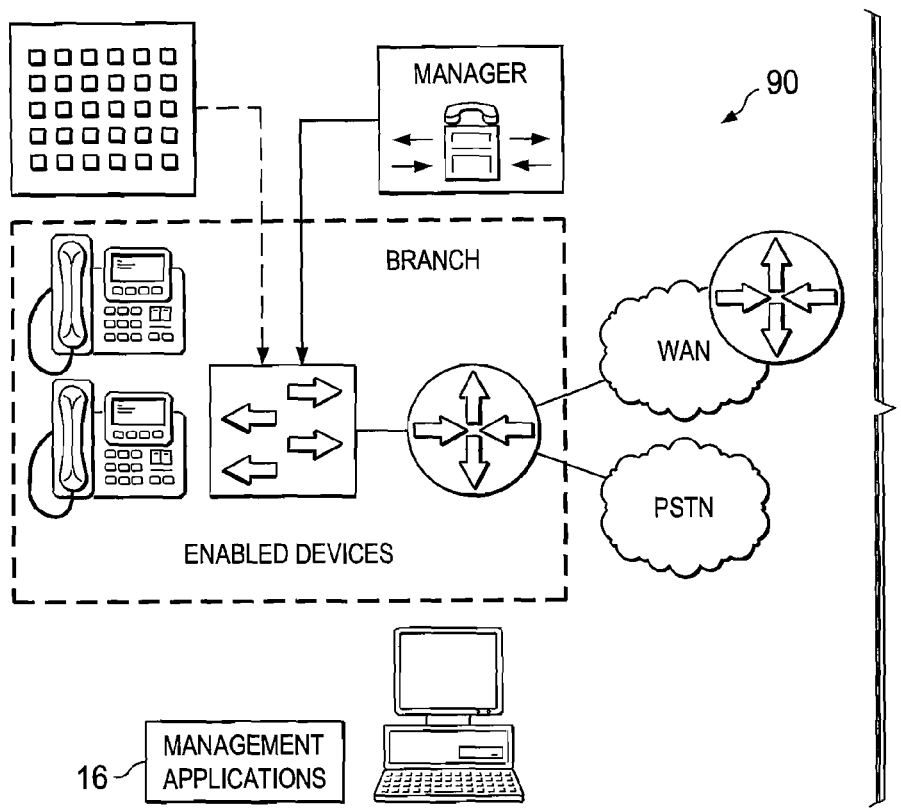
FIG. 9A is a simplified block diagram illustrating an example configuration in accordance with one embodiment of the present invention.

Returning to the figures, FIG. 9A is a simplified block diagram depicting a bank customer branch office configuration 90. This particular office is in operation between 9 AM and 5 PM. The intentions of the administrator are to power off all phones after hours, where power would be returned each morning before the bank opens. This particular scenario includes a manager element, which is coupled to a branch that includes a legacy phone and a switch. The devices within the branch are enabled such that they can be controlled by a given switch that is coupled to the network. Furthermore, this particular arrangement includes management applications 16 that allow an administrator to control the activity, particularly the energy consumption, of the branch.

More specific to the items or elements that would need to be implemented for the intelligent energy management systems to function, the enabled devices of FIG. 9A would include an agent (for example, in software) that allows these devices to respond to commands from the network. The agent allows the enabled devices to become part of the cloud, which can be managed by the devices inside the cloud. Much like certain network management applications, any device within the network can be used as a central management hub. Thus, any simple PC could be used to connect to the cloud in order to control one or more operations of enabled devices. This is in contrast to systems today that require administrators to operate from a central server exclusively. In this sense, the energy management system can use any enabled device as a point of management for other devices in the network.

Figure 9B:
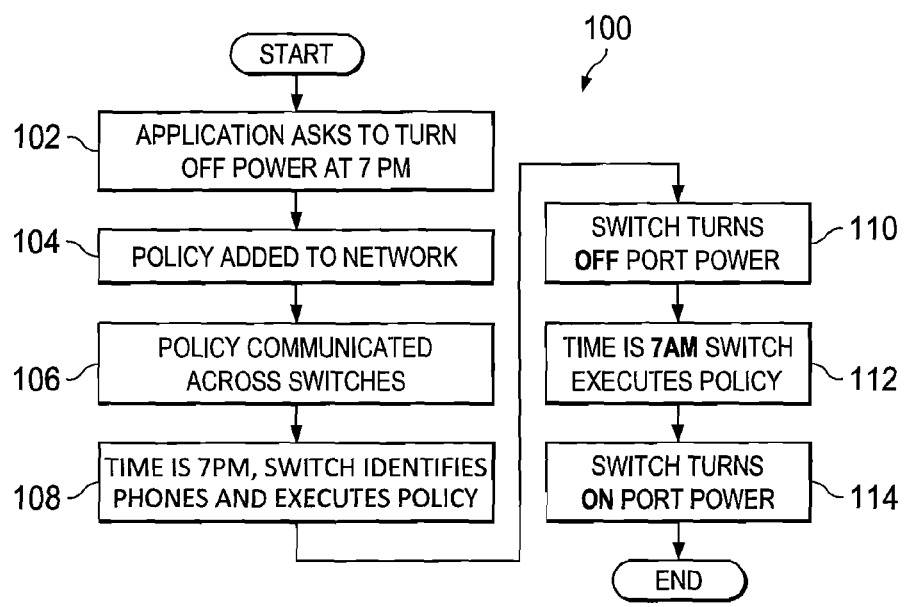
FIG. 9B is a simplified flowchart illustrating a series of example steps associated with the system.

FIG. 9B is a simplified flowchart 100 that can be discussed in conjunction with FIG. 9A. This particular flow begins at step 102, where the management application asks to turn off all power at the branch office at 7 PM. At step 104, the policy is added to the network such that it may be systematically executed. At step 106, the policies care communicated across switches that can control one or more devices, which are enabled to respond to such direction(s). Step 108 illustrates what occurs at 7 PM. The intelligence in the switch identifies the phones for which it is responsible and executes the outlined policy. At step 110, the switch turns off port power. At step 112, the time is now 7 AM and the switch again executes its policy. The switch turns on the port power, at step 114.

Figure 9C:
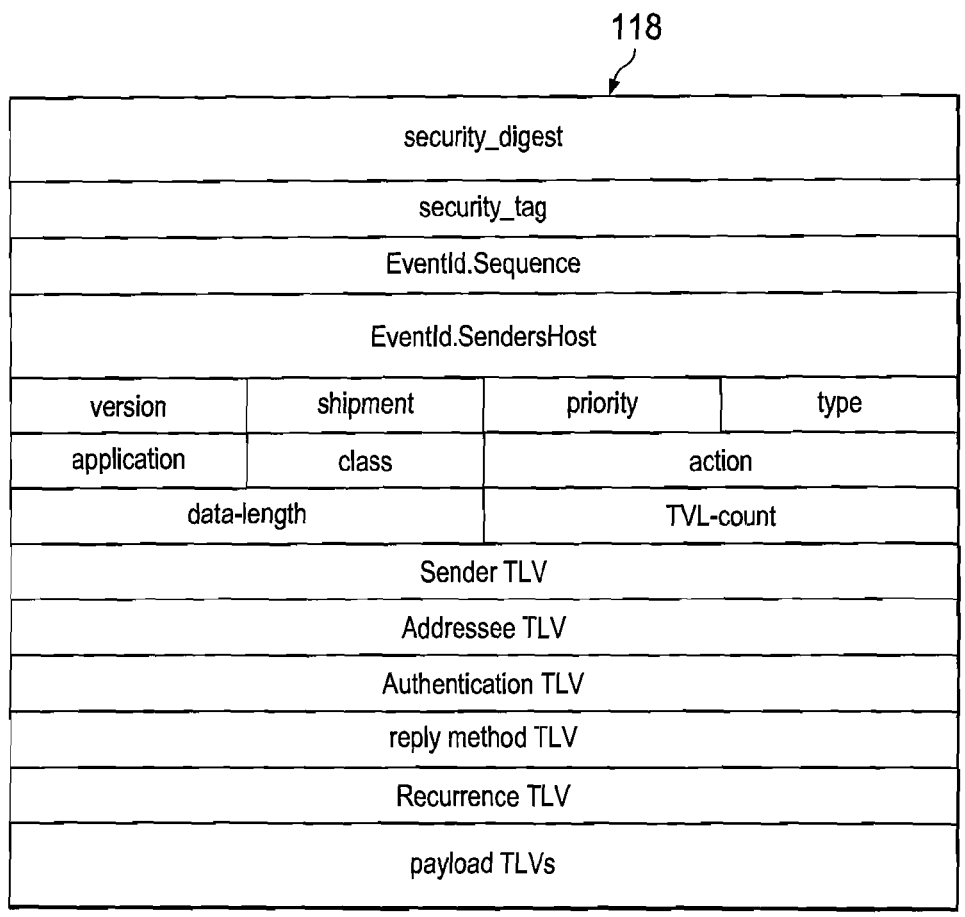
FIG. 9C is a simplified schematic diagram illustrating an example packet format in accordance with one embodiment of the present invention.

FIG. 9C is a simplified schematic diagram offering an example packet format 118. In this example packet, a number of attributes are provided in conjunction with type length values (TLVs). In addition, a number of security characteristics have been provided for this example formatting. Some of these security measures have been implemented for authentication purposes within the domain. Some of the security parameters ensure that something [e.g., an event], which was broadcasted into the domain, was [in fact] authorized.

In one example implementation, only members within the domain can communicate with other members in the domain in order to send energy-related messages within the cloud. This security feature could involve an SH1 digest for the packet, where this is positioned at the beginning of the packet. This allows any recipient of a particular packet to use a shared secret in making a quick computation to verify that packet's authenticity. Note that every event ID can include a sequence number such that it is not replayed erroneously in the system. Thus, if an entity receives an event that included a sequence number that was previously used, the packet would be systematically dropped.

Figure 10A:
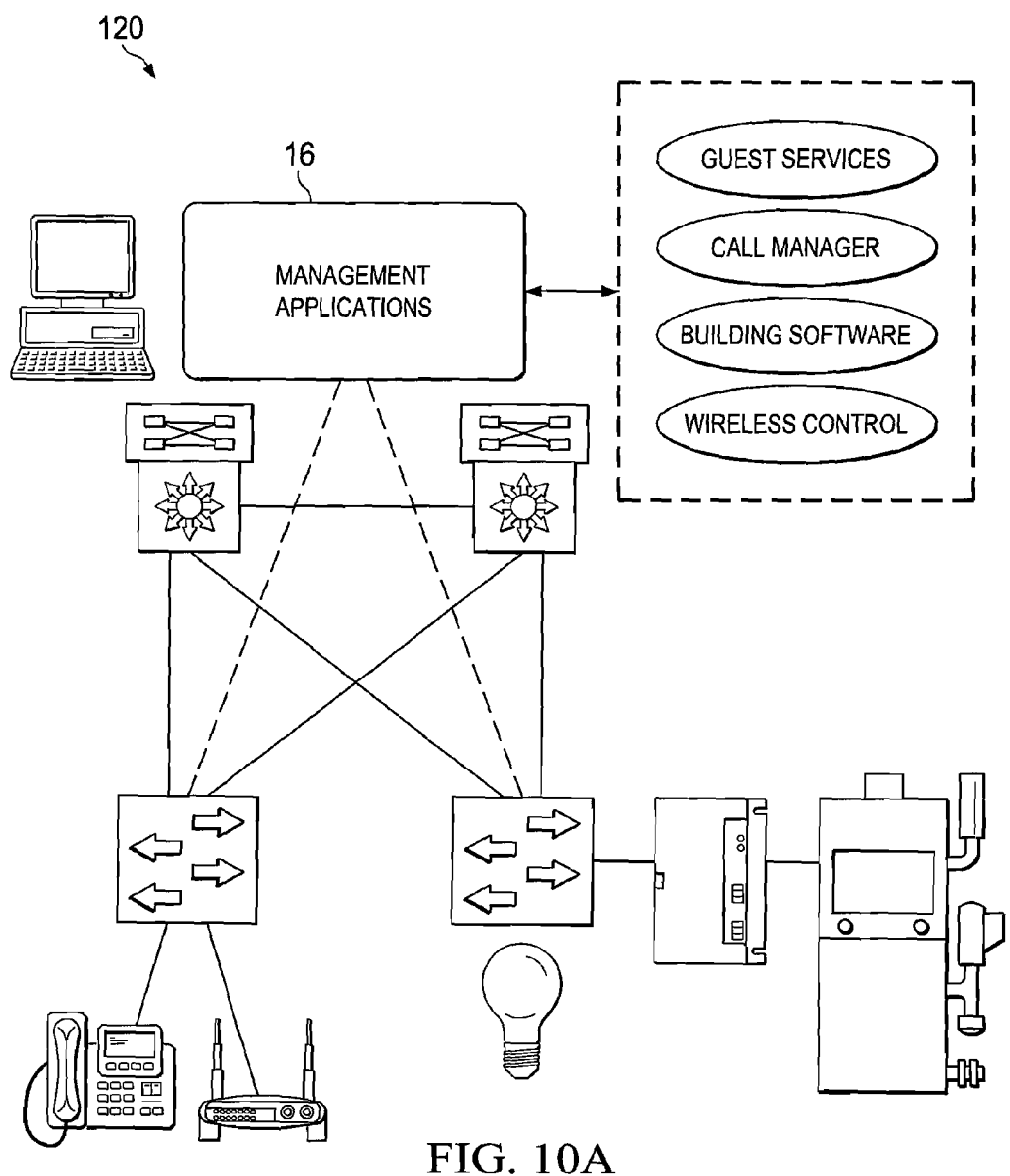
FIG. 10A is a simplified block diagram illustrating an example configuration in accordance with one embodiment of the present invention.
Figure 10B:
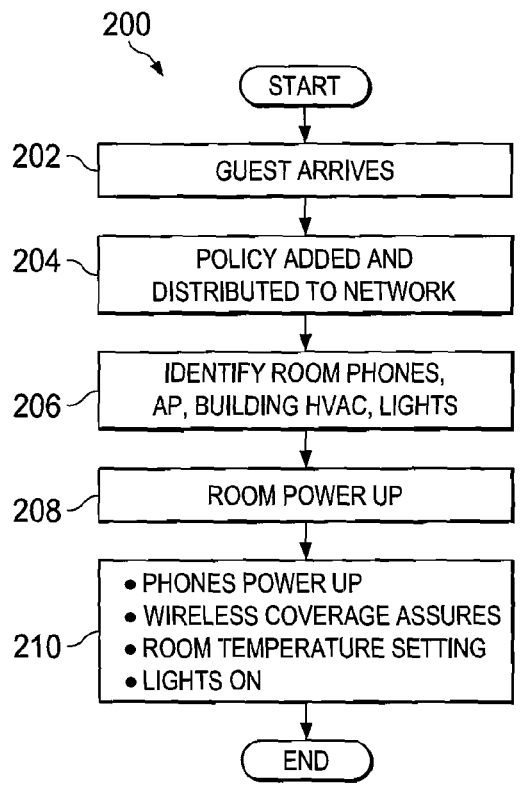
FIG. 10B is a simplified flowchart illustrating a series of example steps associated with the system.

Turning to FIG. 10A, this figure illustrates a hotel guest room control scenario 120. Included in this configuration is a management application, which is coupled to several switches that control one or more devices. These devices in this example include a telephone, a wireless controller, a temperature controller, and a mechanism that controls the lightning. In this particular example, the room setting is customized for a frequent guest. FIG. 10B is a simplified flowchart 200 that can be discussed in conjunction with this hotel guest room control example. The flow begins at step 202, where a guest arrives. At step 204, a policy is added and distributed to the network. At step 206, the management application identifies rooms phones, access points (APs), building HVAC systems, lights, etc. At step 208, the room is powered up. At step 210, the phones are powered up, the wireless coverage is initiated and assured, the room temperature setting is adjusted, and the lights are turned on. The management application can interface with guest services, building software, a call manager, and a wireless control in this particular example.

Note that part of the previous examples involve identifying peak power times in smoothing or time shifting the power usage in a given environment. For example, a management application can monitor power consumption and receive a peak power alert. A policy could be created to minimize this peak consumption. Part of this policy may include identifying eligible phones, laptops, and building HVAC systems that could be candidates for power reductions. For example, in the context of these identified devices, a laptop could move to battery power, while eligible phones may move to a sleep mode and the building temperature is adjusted to coincide with the ambient temperature.

Figure 11:
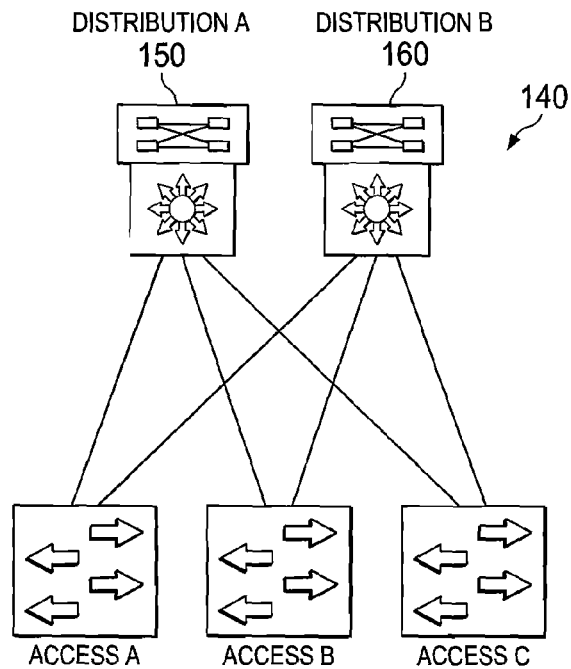
FIG. 11 is a simplified block diagram illustrating an example distribution in accordance with one embodiment of the present invention.

FIG. 11 illustrates a domain configuration 140 that includes a distribution A 150 and a distribution B 160. The distributions are coupled to several access points A, B, C.

In terms of the specific formatting of example configurations, the first line in the configuration can enable the power management system to be triggered/activated and it defines the domain and secret. The shared secret encrypts messages in the domain. Neighbor discovery starts as soon as the power management system is enabled. When the power management is enabled, discovery events can be sent using DP (on available devices) and then UDP. This leads to the population of a neighbor table. Alternatively, a user can set static neighbors if the entity is not reachable via DP or UDP. Both a UDP and a DP handshake can be used in conjunction with the energy management system.

A power level indicates the power state of an entity, where in one example, there are eleven levels in three categories, as depicted below. The actions in response to a power level change are locally interpreted by the entity. The power management application/CLI can tell devices to enter power states using a power level set command (e.g., set level 5). The entity can also communicate its power level back to the network.

| Category | Color | Code | Color | Level | Label |
|---|---|---|---|---|---|
| Operational (1) | | FF0000 | Red | 10 | Full |
| | | | | 9 | High |
| | | FFFF00 | Yellow | 8 | Reduced |
| | | | | 7 | Medium |
| | | 00FF00 | Green | 6 | Frugal |
| | | | | 5 | Low |
| Standby (0) | | 0000FF | Blue | 4 | Ready |
| | | | | 3 | Standby |
| | | A52A2A | Brown | 2 | Sleep |
| | | | | 1 | Hibernate |
| Non-Operational (-1) | | 000000 | Black | 0 | Shut Down |

Figure 12:
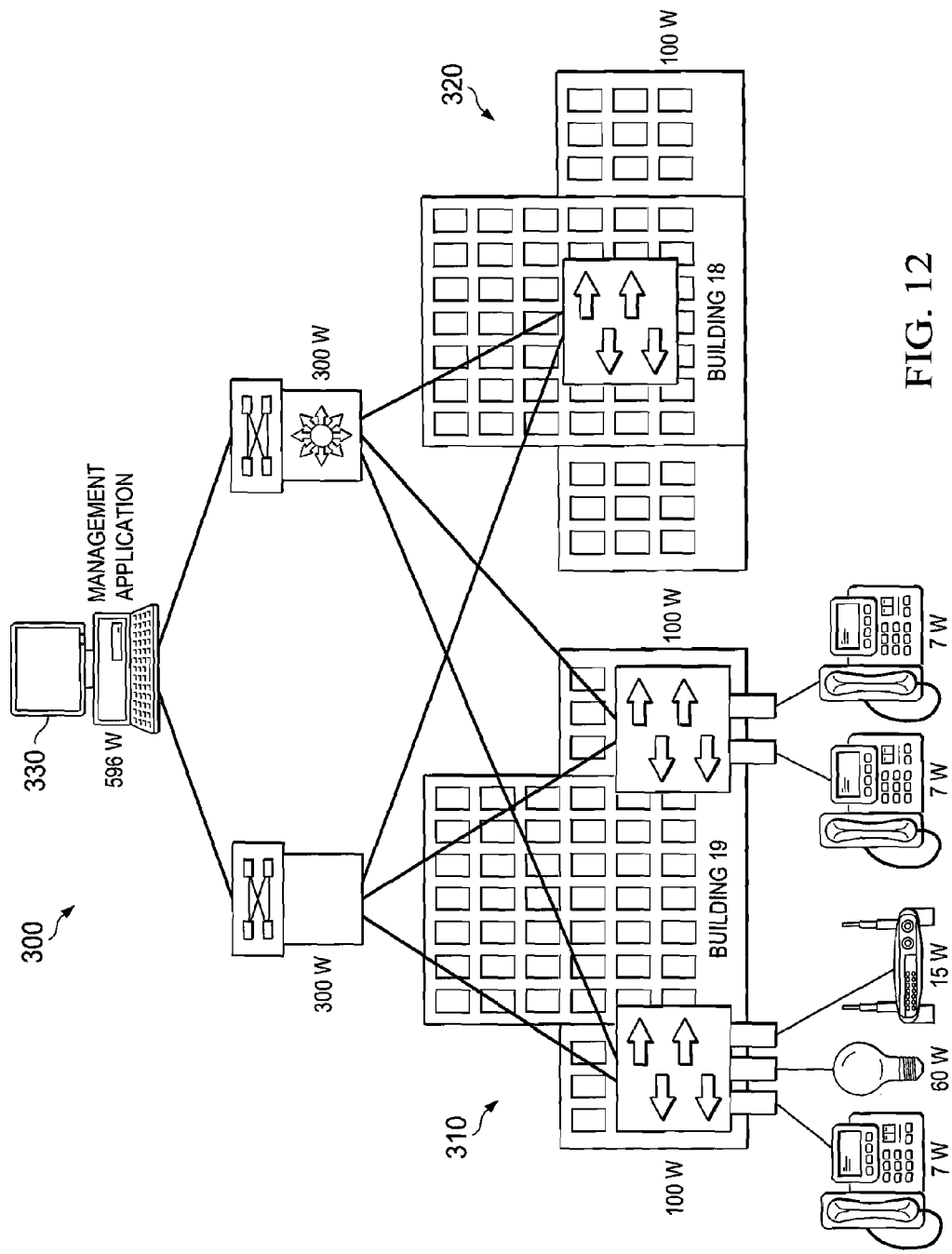
FIG. 12 is a simplified block diagram illustrating an example configuration in accordance with one embodiment of the present invention.

FIG. 12 is a simplified block diagram of an entire domain 300, which is implementing an energy management system, as outlined in example embodiments herein. This configuration includes buildings 18 and 19 (elements represented generally at 320 and 310), along with a management application 330. The domain of a network is independent of the physical domain, as long as there is connectivity across physical domains. In this example, building 18 (though connected to the distribution) is outside the power domain. Note that an administrator can readily identify all the devices that are contributing to power consumption for this particular domain. Some of these devices are active, and some of them are dormant. Certain devices are consuming an inordinate amount of energy, while other devices are consuming minimal levels of energy. The administrator is empowered by the system to focus on devices that are inefficient in their energy usage. Furthermore, administrators can quickly issue new commands to drop energy consumption for individual devices, or across the entire domain.

Note that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that energy management system 10 (and its teachings) are readily scalable and can accommodate a large number of components, as well as more complicated/sophisticated arrangements and configurations. Accordingly, the examples provided should not limit the scope or inhibit the broad teachings of energy management system 10 as potentially applied to a myriad of other architectures.

It is also important to note that the steps in the preceding FIGURES illustrate only some of the possible scenarios that may be executed by, or within, energy management system 10. Some of these steps may be deleted or removed where appropriate, or these steps may be modified or changed considerably without departing from the scope of the present invention. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by energy management system 10 in that any suitable arrangements, chronologies, configurations, and timing mechanisms may be provided without departing from the teachings of the present invention.

Although the present invention has been described in detail with reference to particular arrangements and configurations, these example configurations and arrangements may be changed significantly without departing from the scope of the present invention. For example, although the present invention has been described with reference to particular communication exchanges involving certain protocols (e.g., UDP, SSL, SNMP, etc.), energy management system 10 may be applicable to other exchanges and protocols in which data are exchanged in order to provide energy management operations. In addition, although energy management system 10 has been illustrated with reference to particular elements and operations that facilitate the communication process, these elements and operations may be replaced by any suitable architecture or process that achieves the intended functionality of energy management system 10.

Numerous other changes, substitutions, variations, alterations, and modifications may be ascertained to one skilled in the art and it is intended that the present invention encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this invention in any way that is not otherwise reflected in the appended claims.

What is claimed is:

1. A method, comprising:
communicating a first query over a network to a plurality of entities that reside in a domain, the first query requesting current energy usage;
communicating messages over the network to control power consumption for the entities in the domain;
communicating a second query to a subset of the entities based on their respective priorities in the domain, wherein the second query requests the subset of the entities to determine their respective energy consumption values if they changed their respective energy levels from a first level to a second level; and
receiving a delta value from each entity of the subset of entities to indicate a net energy consumption change that would result from a change to the second level from the first level.

2. The method of claim 1, further comprising:
using a discovery protocol (DP) and a link layer discovery protocol (LLDP) for transporting events regarding the entities that connect or disconnect from the network.

3. The method of claim 1, wherein the entities send a discovery event over a DP/LLDP protocol that identifies them as part of the domain.

4. The method of claim 1, further comprising:
using a user datagram protocol (UDP) broadcast protocol when an entity connects to the network such that the entities maintain neighbor connections.

5. The method of claim 1, wherein the subset of entities communicates a delta value back to a sender of the second query to indicate a net change that would result if the subset of entities changed their respective energy levels from the first level to the second level.

6. The method of claim 1, wherein a response is sent back to a sender of the second query as a collection of responses or as a series of unitary responses.

7. The method of claim 1, wherein energy levels for the entities are part of an array that is indexed numerically.

8. The method of claim 1, wherein energy levels for the entities are part of an array that is indexed by color.

9. The method of claim 1, wherein the second query is communicated using discovery events and neighbor tables to broadcast the second query to the entities.

10. The method of claim 1, wherein the power supply to a first entity in the subset of entities is different than the power supply to a second entity in the subset of entities.

11. An apparatus, comprising:
a management module configured to:
communicate a first query over a network to a plurality of entities that reside in a domain, the first query requesting current energy usage;
communicate messages over the network to control power consumption for the entities in the domain;

communicate a second query to a subset of the entities based on their respective priorities in the domain, wherein the second query requests the subset of the entities to determine their respective energy consumption values if they changed their respective energy levels from a first level to a second level; and receive a delta value, from each entity of the subset of entities to indicate a net energy consumption change that would result from a change to the second level from the first level.

12. The apparatus of claim 11, wherein a particular query instructs the entities to adjust their respective energy usage to a prescribed level.

13. The apparatus of claim 11, wherein a particular query instructs a subset of the entities to adjust their respective energy usage to a prescribed level.

14. The apparatus of claim 11, wherein a particular query asks the entities for a value of an energy attribute.

15. The apparatus of claim 14, wherein the energy attribute is a selected one of the entities' current energy usage.

16. The apparatus of claim 14, wherein the energy attribute is a current energy usage of the domain of the entities.

17. The apparatus of claim 11, wherein a discovery protocol (DP) and a link layer discovery protocol (LLDP) are used for transporting events regarding the entities that connect or disconnect from the network, and wherein the entities send a discovery event over a DP/LLDP protocol that identifies them as part of the domain.

18. Logic encoded in non-transitory media for execution and when executed by a processor operable to:

communicate a first query over a network to a plurality of entities that reside in a domain, the first query requesting current energy usage;

communicate messages over the network to control power consumption for the entities in the domain;

communicate a second query to a subset of the entities based on their respective priorities in the domain, wherein the second query requests the subset of the entities to determine their respective energy consumption values if they changed their respective energy levels from a first level to a second level; and receive a delta value, from each entity of the subset of entities to indicate a net energy consumption change that would result from a change to the second level from the first level.

19. The logic of claim 18, wherein the code is further operable to:

use a discovery protocol (DP) and a link layer discovery protocol (LLDP) for transporting events regarding the entities that connect or disconnect from the network.

20. The logic of claim 18, wherein the entities send a discovery event over a DP/LLDP protocol that identifies them as part of the domain, and wherein a user datagram protocol (UDP) broadcast protocol is used when an entity connects to the network such that the entities maintain neighbor connections.

21. A system, comprising:

means for communicating a first query over a network to a plurality of entities that reside in a domain, the first query requesting current energy usage;

means for communicating messages over the network to control power consumption for the entities in the domain;

means for communicating a second query to a subset of the entities based on their respective priorities in the domain, wherein the second query requests the subset of the entities to determine their respective energy consumption values if they changed their respective energy levels from a first level to a second level; and means for receiving a delta value, from each entity of the subset of entities to indicate a net energy consumption change that would result from a change to the second level from the first level.

22. The system of claim 21, wherein a discovery protocol (DP) and a link layer discovery protocol (LLDP) are used for transporting events regarding the entities that connect or disconnect from the network.

23. The system of claim 21, wherein the entities send a discovery event over a DP/LLDP protocol that identifies them as part of the domain.

24. The system of claim 21, wherein a user datagram protocol (UDP) broadcast protocol is used when an entity connects to the network such that the entities maintain neighbor connections.

25. The system of claim 21, wherein the subset of entities communicates a delta value back to a sender of the second query to indicate a net change that would result if the subset of entities changed their respective energy levels from the first level to the second level.

26. The system of claim 21, wherein a response is sent back to a sender of the second query as a collection of responses or as a series of unitary responses.

* * * * *